United States Patent
Shrimpton et al.

(10) Patent No.: US 10,009,171 B2
(45) Date of Patent: Jun. 26, 2018

(54) CONSTRUCTION AND USES OF VARIABLE-INPUT-LENGTH TWEAKABLE CIPHERS

(71) Applicant: Portland State University, Portland, OR (US)

(72) Inventors: Thomas E. Shrimpton, Portland, OR (US); Robert S. Terashima, Portland, OR (US)

(73) Assignee: Portland State University, Portland, OR (US)

( * ) Notice: Subject to any disclaimer, the term of this patent is extended or adjusted under 35 U.S.C. 154(b) by 0 days. days.

(21) Appl. No.: 15/393,062

(22) Filed: Dec. 28, 2016

(65) Prior Publication Data

US 2017/0104584 A1 Apr. 13, 2017

Related U.S. Application Data

(62) Division of application No. 14/549,531, filed on Nov. 20, 2014, now Pat. No. 9,571,270.
(Continued)

(51) Int. Cl.
*H04L 9/06* (2006.01)
*G06F 12/14* (2006.01)

(52) U.S. Cl.
CPC ........ *H04L 9/0625* (2013.01); *G06F 12/1408* (2013.01); *G06F 2212/1052* (2013.01); *G06F 2212/402* (2013.01)

(58) Field of Classification Search
CPC .................................................. H04L 9/0618
(Continued)

(56) References Cited

U.S. PATENT DOCUMENTS

| 7,221,756 B2 | 5/2007 | Patel et al. |
| 8,661,263 B2 | 2/2014 | Mattsson |

(Continued)

FOREIGN PATENT DOCUMENTS

| JP | 08-335040 | 12/1996 |
| JP | 2007-159104 | 6/2007 |

(Continued)

OTHER PUBLICATIONS

Abdalla et al, "Increasing the Lifetime of a Key: A Comparative Analysis of Re-Keying Techniques," *Proc. of the 6th Int'l Conf. on the Theory and Cryptology and Information Security: Advance in Cryptology*, pp. 546-559 (Oct. 2000).
(Continued)

*Primary Examiner* — Jacob Lipman
(74) *Attorney, Agent, or Firm* — Klarquist Sparkman, LLP

(57) ABSTRACT

Innovations in the construction and use of variable-input-length tweakable ciphers ("VILTCs"). In some cases, a VILTC uses an initialization vector that is protected from exposure outside an encryption/decryption system in order to provide enhanced security with efficient performance. For example, a system for encryption and/or decryption includes two fixed-input-length tweakable block ciphers ("FIL TBCs") and a VILTC. The first FIL TBC is adapted to produce a fixed-length initialization vector. The VILTC is adapted to produce a variable-length output string using the fixed-length initialization vector as a tweak. The second FIL TBC is adapted to produce a fixed-length output string. In this way, the first FIL TBC and the second FIL TBC protect the fixed-length initialization vector from exposure outside the system. In other cases, a VILTC is used for a reliable and efficient implementation of authenticated encryption/decryption with associated data.

29 Claims, 14 Drawing Sheets

Related U.S. Application Data

(60) Provisional application No. 61/910,292, filed on Nov. 29, 2013.

(58) Field of Classification Search
USPC .......................................................... 713/189
See application file for complete search history.

(56) References Cited

U.S. PATENT DOCUMENTS

| | | | |
|---|---|---|---|
| 9,571,270 | B2 | 2/2017 | Shrimpton et al. |
| 2010/0002873 | A1 | 1/2010 | Ferguson |
| 2010/0199091 | A1 | 8/2010 | Ho |
| 2011/0113235 | A1* | 5/2011 | Erickson ................ G06F 21/34 713/152 |
| 2011/0123020 | A1* | 5/2011 | Choi ..................... H04L 9/0637 380/28 |
| 2011/0211691 | A1 | 9/2011 | Minematsu |
| 2012/0314857 | A1 | 12/2012 | Minematsu |
| 2013/0077780 | A1 | 3/2013 | Rogaway |
| 2013/0168450 | A1 | 7/2013 | von Mueller et al. |
| 2013/0308775 | A1 | 11/2013 | Minematsu |

FOREIGN PATENT DOCUMENTS

| | | |
|---|---|---|
| WO | WO 2008/018303 | 2/2008 |
| WO | WO 2009/020060 | 2/2009 |

OTHER PUBLICATIONS

AlFardan et al., "Lucky Thirteen: Breaking the TLS and DTLS Record Protocols," *IEEE Symp. on Security and Privacy*, pp. 526-540 (May 2013).
An et al., "Does Encryption with Redundancy Provide Authenticity?" *Advances in Cryptology*, pp. 512-528 (May 2001).
Aranha et al., "Efficient Software Implementation of Binary Field Arithmetic Using Vector Instruction Sets," *Progress in Cryptology*, pp. 144-161 (Aug. 2010).
Bellare et al., "Authenticated Encryption: Relations Among Notions and Analysis of the Generic Composition Paradigm," *Advances in Cryptology*, pp. 531-545 (Oct. 2000).
Bellare et al., "Code-Based Game-Playing Proofs and the Security of Triple Encryption," *Advances in Cryptology*, vol. 4004, pp. 409-426 (Feb. 2006).
Bellare et al., "Format-Preserving Encryption," *Selected Areas in Cryptography*, pp. 295-312 (2009).
Bellare et al., "Encode-Then-Encipher Encryption: How to Exploit Nonces or Redundancy in Plaintexts for Efficient Cryptography," *Advances in Cryptology*, pp. 317-330 (Oct. 2000).
Bellare et al., "The FFX Mode of Operation for Format-Preserving Encryption," 18 pp. (Feb. 2010).
Black et al., "UMAC: Fast and Secure Message Authentication," *Advances in Cryptology*, vol. 1666, pp. 216-233 (Dec. 1999).
Canvel et al., "Password Interception in a SSL/TLS Channel," *Advances in Cryptology*, pp. 583-599 (Aug. 2003).
Chakraborty et al., "An Improved Security Bound for HCTR," *Fast Software Encryption*, vol. 5086, pp. 289-302 (Feb. 2008).
Chakraborty et al., "A New Mode of Encryption Providing a Tweakable Strong Pseudo-Random Permutation," *Fast Software Encryptiion*, vol. 4047, pp. 293-309 (Mar. 2006).
Chakraborty et al., "HCH: A New Tweakable Enciphering Scheme Using the Hash-Counter-Hash Approach," *IACR Cryptology*, 29 pp. (2007).
Communication Pursuant to Rules 161(2) and 162 EPC dated Jul. 6, 2016, from European Patent Application No. 14876408.7, 2 pp.
Coron et al., "A Domain Extender for the Ideal Cipher," *Theory of Cryptography*, pp. 273-289 (Feb. 2010).
Degabriele et al., "On the (In)Security of IPsec in MAC-then-Encrypt Configurations," *Proc. of the 17th ACM Conf. on Computer and Communications Security*, pp. 493-504 (Oct. 2010).
Halevi, "EME: Extending EME to Handle Arbitrary-Length Messages with Associated Data," *Progress in Cryptology*, pp. 315-237 (Dec. 2004).
Halevi, "Invertible Universal Hashing and the TET Encryption Mode," *Advances in Cryptology*, pp. 412-429 (Aug. 2007).
Halevi et al., "A Tweakable Enciphering Mode," *Advances in Cryptology*, pp. 482-499 (Aug. 2003).
Halevi et al., "A Parallelizable Enciphering Mode," *CT-RSA*, 26 pp. (Jun. 2003).
Hoang et al., "An Enciphering Scheme Based on a Card Shuffle," *Advances in Cryptology*, 13 pp. (2012).
International Search Report and Written Opinion dated Sep. 4, 2015, from International Patent Application No. PCT/US2014/067745, 11 pp.
Lampe et al., "Tweakable Blockciphers with Asymptotically Optimal Security," *Fast Software Encryption*, pp. 133-151 (Mar. 2013).
Landecker et al., "Tweakable Blockciphers with Beyond Birthday-Bound Security," *Advances in Cryptology*, vol. 7417, pp. 14-30 (2012).
Liskov et al., "Tweakable Block Ciphers," *Proc. of the Int'l Cryptology Conf. on Advances in Cryptology*, pp. 31-46 (2002).
Liskov et al., "Tweakable Block Ciphers," *Journal of Cryptology*, vol. 24, Issue 3, pp. 588-613 (Jul. 2011).
Luo et al. "Efficient Software Implementations of Large Finite Fields $GF(2^n)$ for Secure Storage Applications," *ACM Trans. on Storage*, vol. 8, No. 1, 27 pp. (Feb. 2012).
Mancillas-Lopez et al., "Reconfigurable Hardware Implementations of Tweakable Enciphering Schemes," *IEEE Trans. on Computers*, vol. 59, pp. 1547-1561 (2010).
Mathewson, "Cryptographic Challenges in and Around Tor," Slideshow for the Tor Project, 32 pp. (Jan. 2013).
Minematsu, "Beyond-Birthday-Bound Security Based on Tweakable Block Cipher," *Fast Software Encryption*, vol. 5665, pp. 308-326 (Feb. 2009).
Minematsu et al., "Building Blockcipher from Tweakable Blockcipher: Extending FSE 2009 Proposal," *IMA Int'l Conf.*, pp. 391-412 (Dec. 2011).
Morris et al., "How to Encipher Messages on a Small Domain—Deterministic Encryption and the Thorp Shuffle," *Advances in Cryptology*, vol. 5677, pp. 286-302 (2009).
Naor et al., "On the Construction of Pseudo-Random Permutations: Luby-rackoff Revisited," *Proc. of the 29th Annual ACM Symp. on Theory of Computing*, pp. 189-199 (1997).
Notice of Allowance dated Dec. 26, 2016, from Japanese Patent Application No. 2016-556687, 3 pp.
Paterson et al., "Padding Oracle Attacks on the ISO CBC Mode Encryption Standard," *Topics in Cryptology*, pp. 305-323 (Feb. 2004).
Rogaway, "Authenticated-Encryption with Associated-Data," *ACM Conf. on Computer and Communications Security*, pp. 98-107 (2002).
Rogaway, "Efficient Instantiations of Tweakable Blockciphers and Refinements to Modes OCB and PMAC," *Advances in Cryptology*, pp. 55-73 (2004).
Rogaway, "Nonce-based Symmetric Encryption," *Fast Software Encryption*, pp. 348-359 (Feb. 2004).
Rogaway et al., "OCB: A Block-Cipher Mode of Operation for Efficient Authenticated Encryption," *Proc. of the 8th ACM Conf. on Computer and Communications Security*, pp. 196-205 (2001).
Rogaway et al., "A Provable-Security Treatment of the Key-Wrap Problem," *EURO-CRYPT*, pp. 373-390 (May 2006).
Sarkar, "Improving Upon the TET Mode of Operation," *Information Security and Cryptology*, vol. 4817, pp. 180-192 (Nov. 2007).
Sarkar, "Efficient Tweakable Enciphering Schemes from (Block-Wise) Universal Hash Functions," *IEEE Trans. Inf. Theory*, vol. 55, No. 10, pp. 4749-4760 (Oct. 2009).
Sarkar, "Pseudo-Random Functions and Parallelizable Modes of Operations of a Block Cipher," *IEEE Trans. on Information Theory*, vol. 56, No. 8, pp. 4025-4037 (Aug. 2010).
Shrimpton et al., "A Modular Framework for Building Variable-Input-Length Tweakable Ciphers," *Advances in Cryptology*, pp. 405-423 (Dec. 2013).

(56) References Cited

OTHER PUBLICATIONS

Vaudenay, "Security Flaws Induced by CBC Padding Applications to SSL, IPSEC, WTLS . . . ," *Advances in Cryptology*, pp. 534-545 (Apr. 2002).
Wang et al., "HCTR: A Variable-Input-Length Enciphering Mode," *Information Security and Cryptology*, pp. 175-188 (Dec. 2005).
Wegman et al., "New Hash Functions and Their Use in Authentication and Set Equality," *Journal of Computer and System Sciences*, vol. 22, No. 3, pp. 265-279 (Jun. 1981).
Zhang, "Length-doubling Ciphers and Tweakable Ciphers," *Applied Cryptography and Network Security*, pp. 100-116 (Jun. 2012).
Supplementary European Search Report dated May 19, 2017, from European Patent Application No. 14876408.7, 4 pp.
Communication Pursuant to Article 94(3) EPC dated Jun. 6, 2017, from European Patent Application No. 14876408.7, 6 pp.
International Preliminary Report on Patentability dated May 31, 2016, from International Patent Application No. PCT/US2014/067745, 7 pp.
Communication Pursuant to Article 94(3) EPC dated Jan. 18, 2018, from European Patent Application No. 14876408.7, 4 pp.
Notice of Reasons for Rejection dated Mar. 8, 2018, from Japanese Patent Application No. 2017-009299, 13 pp.

\* cited by examiner software 180 implementing one or more innovations for construction and uses of variable-input-length tweakable ciphers

200

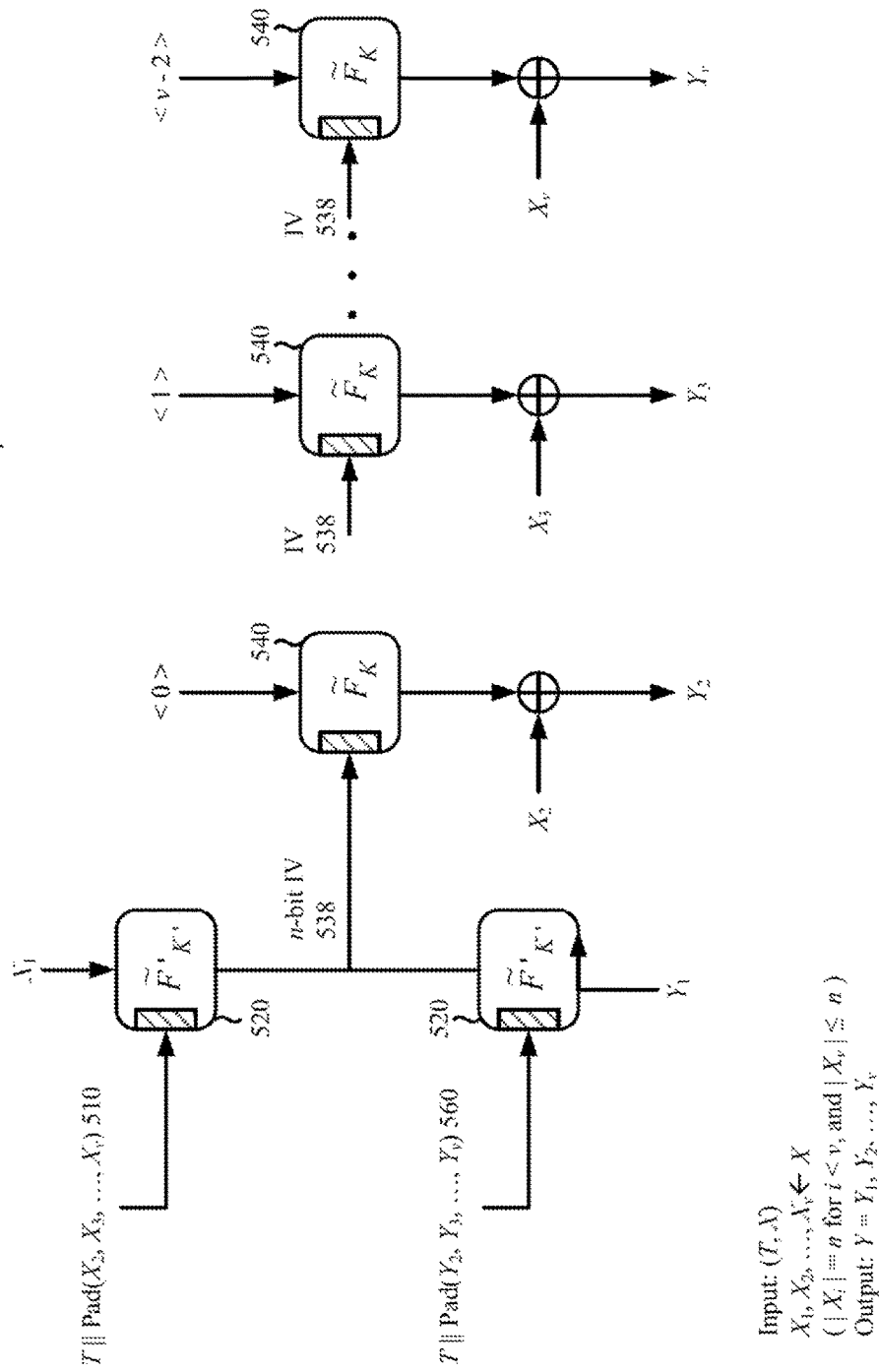

Figure 5b $\quad$ LRW2[polyH$^{2n}$, $E$ ]$^{NH[\,(l+r)\cdot n, 2n]}$
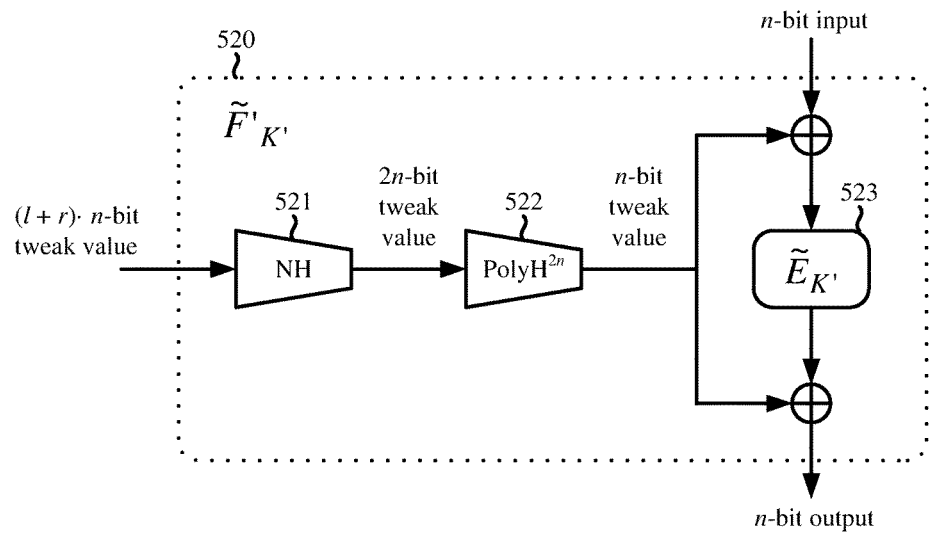
Figure 5c $\quad$ LRW2[polyH$^n$, $E$ ]
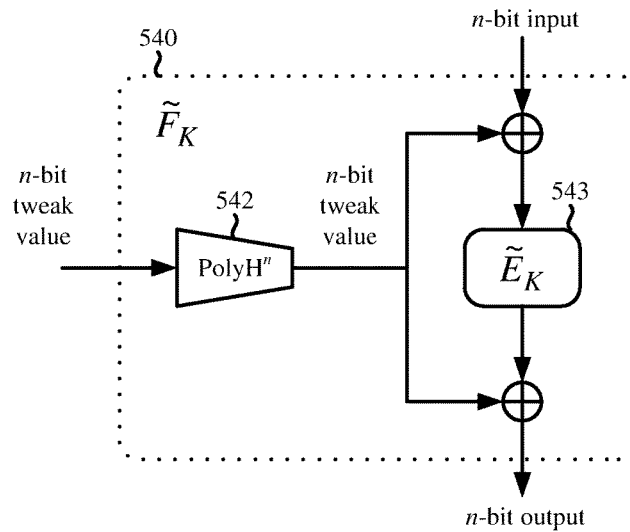

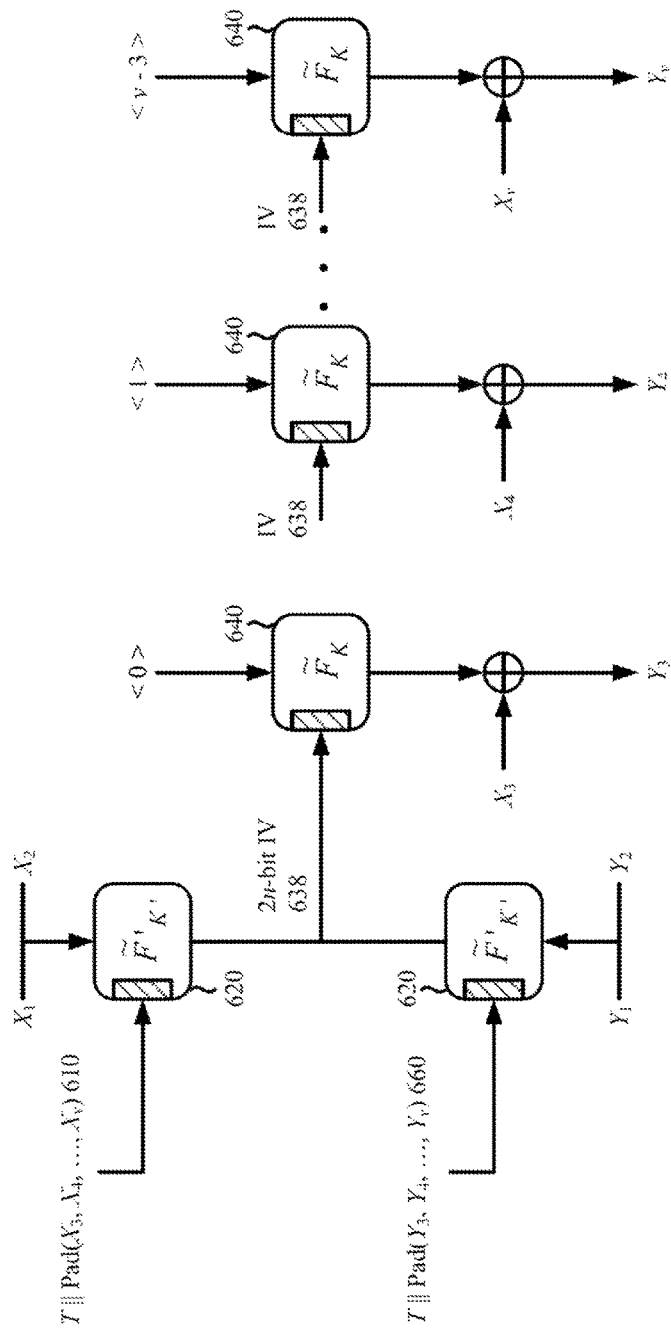

CLRW2[polyH$^{r \cdot n}$, $E$ ]

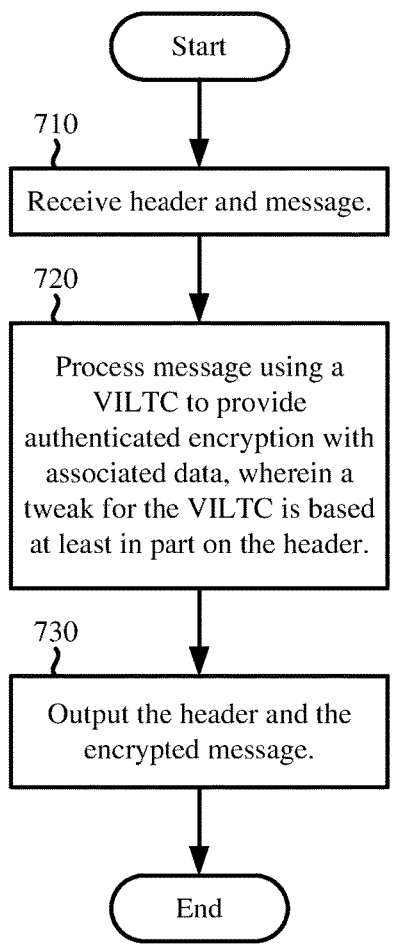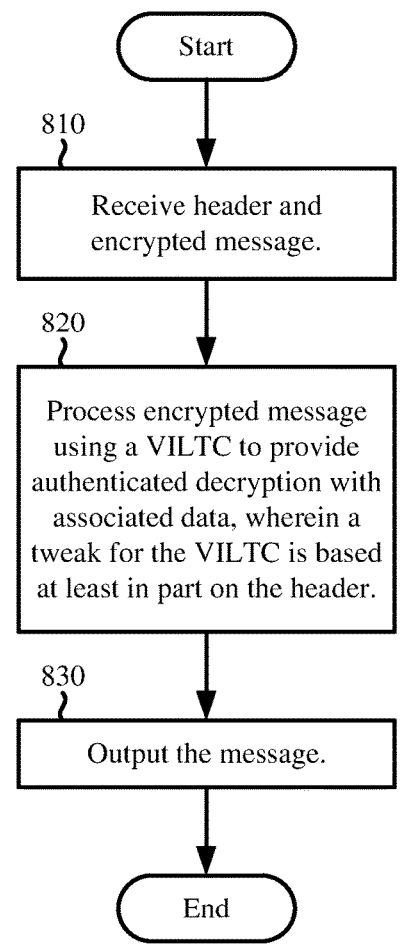

Figure 9

GAMES $\boxed{G1}$, $G2$

900

Oracle $\mathcal{E}_\ell(T,X)$:
200  $j \leftarrow j + 1$
201  $T_j \leftarrow T \| X[N+1..]$
202  $IV_j \xleftarrow{\$} \{0,1\}^N \setminus \text{range}(\Pi[T_j'])$
203  $\Pi[T_j](X[1..N]) \leftarrow IV_j$
204  $IV \leftarrow IV_j$
205  if $IV_j \in \{IV_i : i < j\}$ then
206    $bad_1 \leftarrow \text{true}$
207    $IV_j \xleftarrow{\$} \{0,1\}^N \setminus \{IV_i : i < j\}$
208    $\boxed{IV_j \leftarrow IV}$
209  $Z_i \leftarrow V(IV_j)(X[N+1..])$
210  $T_j' \leftarrow T \| Z_i$
211  $Z_i' \xleftarrow{\$} \{0,1\}^N$
212  if $IV_j \in \text{dom}(\Pi[T_j'])$ then
213    $bad_2 \leftarrow \text{true}$
214    $\boxed{Z_i' \leftarrow \Pi[T_j'](IV_j)}$
215  else if $Z_i' \in \text{range}(\Pi[T_j'])$ then
216    $bad_3 \leftarrow \text{true}$
217    $\boxed{Z_i' \xleftarrow{\$} \{0,1\}^N \setminus \text{range}(\Pi[T_j'])}$
218  return $Z_i' \| Z_i'$ Oracle $\mathcal{E}_\ell^{-1}(T,Y)$:
219  $j \leftarrow j + 1$
220  $T_j \leftarrow T \| Y[N+1..]$
221  $IV_j \xleftarrow{\$} \{0,1\}^N \setminus \text{dom}(\Pi[T_j])$
222  $\Pi[T_j]^{-1}(Y[1..N]) \leftarrow IV_j$
223  $IV \leftarrow IV_j$
224  if $IV_j \in \{IV_i : i < j\}$ then
225    $bad_1 \leftarrow \text{true}$
226    $IV_j \xleftarrow{\$} \{0,1\}^N \setminus \{IV_i : i < j\}$
227    $\boxed{IV_j \leftarrow IV}$
228  $Z_i \leftarrow V(IV_j)^{-1}(Y[N+1..])$
229  $T_j' \leftarrow T \| Z_i$
230  $Z_i' \xleftarrow{\$} \{0,1\}^N$
231  if $IV_j \in \text{range}(\Pi[T_j'])$ then
232    $bad_2 \leftarrow \text{true}$
233    $\boxed{Z_i' \leftarrow \Pi[T_j']^{-1}(IV_j)}$
234  else if $Z_i' \in \text{dom}(\Pi[T_j'])$ then
235    $bad_3 \leftarrow \text{true}$
236    $\boxed{Z_i' \xleftarrow{\$} \{0,1\}^N \setminus \text{range}(\Pi[T_j'])}$
237  return $Z_i' \| Z_i'$

GAMES $G1$, $G2$

Oracle $\mathcal{E}_\Pi(H, M)$:
$i \leftarrow i + 1; M_i \leftarrow M$
$\overline{H}_i \leftarrow (r, H_i) \xleftarrow{\$} \text{Encoder}(H_i)$
$\overline{M}_i \xleftarrow{\$} \text{Encode}_M(\overline{H}_i, M_i)$
$S_i \xleftarrow{\$} \{0, 1\}^{|\overline{M}|}$
if $S_i \in \text{range}(\Pi(\overline{H}_i, \cdot))$ then
    $\text{bad}_2 \leftarrow \text{true}$
    $\boxed{S_i \xleftarrow{\$} \{0, 1\}^{|\overline{M}|} \setminus \text{range}(\Pi(\overline{H}_i, \cdot))}$
if $\overline{M}_i \in \text{dom}(\Pi(\overline{H}_i, \cdot))$ then
    $\text{bad}_1 \leftarrow \text{true}$
    $\boxed{S_i \leftarrow \Pi(\overline{H}_i, \overline{M}_i)}$
$\Pi(\overline{H}_i, \overline{M}_i) \leftarrow S_i$
return $r \| S_i$

GAME $G3$ procedure $\text{Main}(A)$:
$b \xleftarrow{\$} A^{\mathcal{E}(\cdot, \cdot)}$
for $i \leftarrow 1$ to $q$ do
    $\overline{M}_i \xleftarrow{\$} \text{Encode}_M(\overline{H}_i, M_i)$
    if $\overline{M}_i \in \text{dom}(\Pi(\overline{H}_i, \cdot))$ then $\text{bad}_1 \leftarrow \text{true}$
    if $S_i \in \text{range}(\Pi(\overline{H}_i, \cdot))$ then $\text{bad}_2 \leftarrow \text{true}$
    $\Pi(\overline{H}_i, \overline{M}_i) \leftarrow S_i$
return $b$ Oracle $\mathcal{E}_\Pi(H, M)$:
$i \leftarrow i + 1; M_i \leftarrow M$
$\overline{H}_i \leftarrow (r, H_i) \xleftarrow{\$} \text{Encoder}(H_i)$
$S_i \xleftarrow{\$} \{0, 1\}^{|\overline{M}|}$
return $r \| S_i$

Oracle $\mathcal{E}_\Pi(H, M)$:
$\overline{H} \leftarrow (r, H)$
$\overline{M} \stackrel{\$}{\leftarrow} \text{Encode}_M(\overline{H}, M)$
if $\overline{M} \notin \text{dom}(\Pi(\overline{H}, \cdot))$ then
$\quad \Pi(\overline{H}, \overline{M}) \stackrel{\$}{\leftarrow} \{0,1\}^{|\overline{M}|} \setminus \text{range}(\Pi(\overline{H}, \cdot))$
return $r \parallel \Pi(\overline{H}, \overline{M})$ Oracle $\mathcal{D}_\Pi(H, r, C)$:
$\overline{H} \leftarrow (r, H)$
$\overline{M} \stackrel{\$}{\leftarrow} \{0,1\}^{|C|} \setminus \text{dom}(\Pi(\overline{H}, \cdot))$
$\Pi(\overline{H}, \overline{M}) \leftarrow C$
$M \leftarrow \text{Decode}_M(\overline{H}, \overline{M})$
if $M \in \text{Errors}$ then $\text{Forges} \leftarrow \text{true}$
$\quad$ return $M$ GAME $\mathcal{C}_4$

CONSTRUCTION AND USES OF VARIABLE-INPUT-LENGTH TWEAKABLE CIPHERS

RELATED APPLICATION INFORMATION

This application is a divisional of U.S. patent application Ser. No. 14/549,531, filed Nov. 20, 2014, which claims the benefit of U.S. Provisional Patent Application No. 61/910,292, filed Nov. 29, 2013, the disclosures of which are hereby incorporated by reference.

ACKNOWLEDGMENT OF GOVERNMENT SUPPORT

This invention was made with government support under CNS-0845610 and CNS-1319061 awarded by National Science Foundation. The government has certain rights in the invention.

FIELD

Construction and use of variable-input-length tweakable ciphers with protected initialization vectors.

BACKGROUND

In general, encryption is the process of encoding information so that only authorized parties, and not third parties, can read the information. In an encryption scheme, the information (referred to as plaintext) is encrypted using an encryption algorithm, turning it into an unreadable ciphertext. An authorized party is able to decode the ciphertext using a decryption algorithm. In computer systems, encryption algorithms encrypt binary values (that is, bits) of information.

A block cipher is an encryption algorithm operating on a fixed-length block of bits. An n-bit block cipher encrypts a block of n bits, producing n bits of ciphertext. Block ciphers are widely used, and there are many efficient implementations of block ciphers. A block cipher uses an encryption key. The security of a block cipher is understood to degrade as the number of blocks encrypted under a particular key increases. While changing the key to a block cipher is not difficult in itself, in several important applications the frequent generation and distribution of new block cipher keys is infeasible.

A tweakable block cipher ("TBC") is a generalization of a block cipher. An n-character TBC $\tilde{E}$ is a family of permutations over $\Sigma^n$, where each permutation in the TBC is associated with a key and a tweak. Often, $\Sigma=\{0,1\}$, in which case the TBC can be termed an n-bit TBC $\tilde{E}$.) For an input string, the key and tweak together specify the permutation of the input string that is produced by the TBC. In typical usage, the key is secret and fixed across many calls to the TBC, while the tweak is not secret and may change from call to call. This supports variability in the behavior of the TBC by changing values of the tweak, even though the key is fixed. If changing values of the tweak is sufficiently simple (compared to the process of key setup and update), using a TBC can be an efficient way to expand the volume of data that is securely encrypted with a block cipher. Using TBCs can simplify designing and analyzing algorithms (e.g., algorithms that can safely handle large volumes of data) A TBC may be useful when the volume of data to be encrypted is very large, compared to the available key material, and changing the block cipher key is not desirable or feasible.

Even in applications in which the volume of data to be processed is not overly large, the tweak input can empower useful features in practical applications, such as using a TBC with a fixed key across several cryptographic uses, or across multiple users.

A tweakable cipher, sometimes called a tweakable enciphering scheme or large-block cipher, is an extension of a TBC to the variable-input-length ("VIL") setting. Generally, a VIL tweakable cipher ("VILTC") is a family of length-preserving permutations, producing ciphertext output with the same length as the plaintext input. One common approach to implementing VILTCs has been to construct a VILTC primitive from an underlying n-bit block cipher, sometimes in conjunction with one or more hashing operations. VILTCs constructed according to this approach may not provide sufficient security guarantees for some important use case scenarios, in particular, when n is small (e.g., 64), or when the amount of data to be processed by a single key is very large.

SUMMARY

In summary, the detailed description presents innovations in the construction and use of variable-input-length tweakable ciphers ("VILTCs"). In some cases, these VILTCs use an initialization vector that is protected from exposure outside an encryption/decryption system in order to provide enhanced security with efficient performance. In other cases, a VILTC is used for a reliable and efficient implementation of authenticated encryption/decryption with associated data.

According to one aspect of the innovations described herein, a system for encryption and/or decryption includes two fixed-input-length tweakable block ciphers ("FIL TBCs") and a VILTC. Typically, the two FIL TBCs are provided through two calls to a single FIL TBC component. Alternatively, however, the two FIL TBCs can be provided with two different FIL TBCs.

The first FIL TBC (e.g., a first call to a given FIL TBC component, or a first different FIL TBC component) is adapted to produce a fixed-length initialization vector. For example, in a first call, the given FIL TBC component accepts a fixed-length input string, as first input for the given FIL TBC component, and a combination of a tweak for the system and a variable-length input string, as first tweak for the given FIL TBC component. The VILTC is adapted to produce a variable-length output string using the fixed-length initialization vector as a tweak. The second FIL TBC (e.g., a second call to the given FIL TBC component, or a second different FIL TBC component) is adapted to produce a fixed-length output string. For example, in a second call, the given FIL TBC component accepts the fixed-length initialization vector, as second input for the given FIL TBC component, and a combination of the system tweak and the variable-length output string, as second tweak for the given FIL TBC component. The first FIL TBC and the second FIL TBC protect the fixed-length initialization vector from exposure outside the system. The system tweak can be based on an environmental feature of the system.

According to another aspect of the innovations described herein, a system for encryption and/or decryption includes two N-character TBCs and a VILTC. The first N-character TBC (e.g., a first call to a given N-character TBC component, or a first different N-character TBC component) is adapted to produce an N-character initialization vector. The VILTC is adapted to produce a variable-length output string using the N-character initialization vector as a tweak. The second N-character TBC (e.g., a second call to the given N-character TBC component, or second different N-character TBC component) is adapted to produce an N-character output string. In this way, the first N-character TBC and the second N-character TBC protect the N-character initialization vector from exposure outside the system.

The system can include multiple buffers. For example, a first buffer stores an N-character input string and a variable-length input string, and a second buffer stores the N-character output string and the variable-length output string. Characters of the N-character input string, the variable-length input string, the N-character output string, and the variable-length output string are selected from a pre-determined, finite set of symbols (e.g., numbers 0 . . . 9, letters A . . . Z and numbers 0 . . . 9). The system's inputs also include one or more keys and a tweak value. The first N-character TBC, the VILTC and the second N-character TBC can be constructed from randomly generated permutation look-up tables. More generally, the first N-character TBC, the second N-character TBC, and the VILTC can be implemented using special-purpose hardware or implemented using software that executes on general-purpose hardware.

In example implementations, the first N-character TBC is adapted to produce the N-character initialization vector using an N-character input string, as input for the first N-character TBC, and a combination of a tweak for the system and a variable-length input string, as tweak for the first N-character TBC. The VILTC is adapted to produce the variable-length output string using the N-bit initialization vector, as tweak for the VILTC, and the variable-length input string, as input for the VILTC. The second N-character TBC is adapted to produce the N-character output string using the N-character initialization vector, as input for the second N-character TBC, and a combination of the tweak for the system and the variable-length output string, as tweak for the second N-character TBC.

According to another aspect of the innovations described herein, a system for encryption and/or decryption includes two N-bit tweakable block ciphers ("TBCs") and a VILTC. The first N-bit TBC (e.g., a first call to a given N-bit TBC component, or first different N-bit TBC component) is adapted to produce an N-bit initialization vector. The VILTC is adapted to produce a variable-length output string using the N-bit initialization vector as a tweak. The second N-bit TBC (e.g., a second call to the given N-bit TBC component, or a second different N-bit TBC component) is adapted to produce an N-bit output string. In this way, the first N-bit TBC and the second N-bit TBC protect the N-bit initialization vector from exposure outside the system.

The system can include multiple buffers. For example, a first buffer stores an N-bit input string and a variable-length input string, and a second buffer stores the N-bit output string and the variable-length output string. The system's inputs also include one or more keys and a tweak value. The system can also include a controller adapted to adjust N to trade off security and implementation efficiency. A smaller value of N provides worse security but simplifies efficient implementation subject to security constraints. On the other hand, a larger value of N provides better security but complicates efficient implementation subject to the security constraints.

In example implementations, the first N-bit TBC is adapted to produce the N-bit initialization vector using an N-bit input string, as input for the first N-bit TBC, and a combination of a tweak for the system and a variable-length input string, as tweak for the first N-bit TBC. The VILTC is adapted to produce the variable-length output string using the N-bit initialization vector, as tweak for the VILTC, and the variable-length input string, as input for the VILTC. The second N-bit TBC is adapted to produce the N-bit output string using the N-bit initialization vector, as input for the second N-bit TBC, and a combination of the tweak for the system and the variable-length output string, as tweak for the second N-bit TBC. For example, given a tweak T and an B-bit input X (with B>N), the first N-bits of the input X ($X_L$) serve as the input to the first N-bit TBC (e.g., call to N-bit TBC), and the combination of the remaining (B-N) input bits ($X_R$) and T serve as the tweak for the first N-bit TBC. The N-bit output of this TBC serve as the initialization vector for the VILTC call, and $X_R$ serves as the input to the VILTC call, producing a (B-N)-bit output ($Y_R$). Finally, the combination of $Y_R$ and T serve as the tweak to a second N-bit TBC (e.g., call to N-bit TBC), which takes the initialization vector as input, and produces an N-bit output ($Y_L$). The concatenation of $Y_L$ with $Y_R$ is the resulting output. The length of this concatenation is exactly B-bits, so that the overall processing is length-preserving from input to output.

The first N-bit TBC and the second N-bit TBC can have an identical structure or different structures. As noted, the first N-bit TBC and second N-bit TBC can be provided through two calls to the same N-bit TBC component, with different inputs and outputs. In one implementation, at least one of the first N-bit TBC and the second N-bit TBC is an LRW2 TBC construction (defined below), and the VILTC is an iterated LRW2 TBC construction (defined below). In another implementation, at least one of the first N-bit TBC and the second N-bit TBC is a domain-extended CLRW2 construction (defined below), and the VILTC is an iterated CLRW2 construction (defined below). More generally, the first N-bit TBC, the second N-bit TBC, and the VILTC can be implemented using special-purpose hardware or implemented using software that executes on general-purpose hardware.

According to another aspect of the innovations described herein, a system such as an encryption system or decryption system processes a fixed-length input string, a tweak for the system, and a variable-length input string to produce a fixed-length output string and a variable-length output string. The tweak for the system can be set based on an environmental feature. As part of the processing, the system produces a fixed-length initialization vector, produces the variable-length output string with a VILTC using the fixed-length initialization vector as a tweak, and then obscures the fixed-length initialization vector. The system outputs the fixed-length output string and the variable-length output string.

According to another aspect of the innovations described herein, a system such as an encryption system or decryption system processes an N-character input string, a tweak for the system, and a variable-length input string to produce an N-character output string and a variable-length output string. As part of the processing, the system produces an N-character initialization vector, produces the variable-length output string with a VILTC using the N-character initialization vector as a tweak, and then obscures the N-character initialization vector. The system outputs the N-character output string and the variable-length output string.

The processing can be part of, for example, (1) format-preserving encryption, (2) format-preserving decryption, or (3) some other encryption or decryption activity. For encryption, the N-character input string and the variable-length input string are plaintext, and the N-character output string and the variable-length output string are ciphertext. For decryption, the N-character input string and the variable-length input string are ciphertext, and the N-character output string and the variable-length output string are plaintext.

In example implementations, the N-character initialization vector is produced with a first FIL TBC and is obscured by a second FIL TBC, which produces the N-character output string. The N-character initialization vector is produced with the first FIL TBC based on the N-character input string, as input for the first FIL TBC, and a combination of a tweak for the system and the variable-length input string, as tweak for the first FIL TBC. The variable-length output string is produced with the VILTC based on the N-character initialization vector, as tweak for the VILTC, and the variable-length input string, as input for the VILTC. The N-character output string is produced with the second FIL TBC based on the N-character initialization vector, as input for the second FIL TBC, and a combination of the tweak for the system and the variable-length output string, as tweak for the second FIL TBC. The system tweak can be set based on an environmental feature.

According to another aspect of the innovations described herein, a system such as an encryption system or decryption system processes an N-bit input string, a tweak for the system, and a variable-length input string to produce an N-bit output string and a variable-length output string. As part of the processing, the system produces an N-bit initialization vector, produces the variable-length output string with a VILTC using the N-bit initialization vector as a tweak, and then obscures the N-bit initialization vector. The system outputs the N-bit output string and the variable-length output string.

The processing can be part of, for example, (1) full-disk encryption, (2) full-disk decryption, (3) authenticated encryption with associated data, (4) authenticated decryption with associated data or (5) some other encryption or decryption activity. For encryption, the N-bit input string and the variable-length input string are plaintext, and the N-bit output string and the variable-length output string are ciphertext. For decryption, the N-bit input string and the variable-length input string are ciphertext, and the N-bit output string and the variable-length output string are plaintext.

In example implementations, the N-bit initialization vector is produced with a first N-bit TBC and is obscured by a second N-bit TBC, which produces the N-bit output string. The N-bit initialization vector is produced with the first N-bit TBC based on the N-bit input string, as input for the first N-bit TBC, and a combination of a tweak for the system and the variable-length input string, as tweak for the first N-bit TBC. The variable-length output string is produced with the VILTC based on the N-bit initialization vector, as tweak for the VILTC, and the variable-length input string, as input for the VILTC. The N-bit output string is produced with the second N-bit TBC based on the N-bit initialization vector, as input for the second N-bit TBC, and a combination of the tweak for the system and the variable-length output string, as tweak for the second N-bit TBC. The system tweak can be set based on an environmental feature.

According to another aspect of the innovations described herein, an encryption system receives a header and a message. The encryption system processes the message using a VILTC to provide authenticated encryption with associated data. A tweak for the VILTC is based at least in part on the header. The encryption system outputs the header and the encrypted message.

In example implementations, when it processes the message, the encryption system determines a modified header using the header and reconstruction information, determines a modified message using the message and the modified header, and encrypts the modified message using the VILTC with the modified header as the tweak for the VILTC. The encryption system outputs the reconstruction information.

A corresponding decryption system receives a header and an encrypted message (along with any reconstruction information). The decryption system processes the encrypted message using a VILTC to provide authenticated decryption with associated data. A tweak for the VILTC is based at least in part on the header. The decryption system outputs the message.

In example implementations, when it processes the encrypted message, the decryption system determines a modified header using the header and the reconstruction information, decrypts the encrypted message using the VILTC with the modified header as the tweak for the VILTC, and determines the message using the modified message and the modified header.

Optionally, for an authentication step, the decryption system checks to see if the message is valid. For example, if a pre-determined number of "0" bits have been appended to a message during encryption, then decryption can check for the presence of those bits. If this check fails, then decryption outputs an error. There may be multiple different checks for a message to pass, and the output error(s) may vary depending on which (combination of) checks fail. (This is the "authenticated" part of "authenticated encryption"—if an attacker tampers with an encrypted message, it will likely no longer be valid once decrypted.)

The innovations for constructing and using VILTCs can be implemented as part of a method, as part of a computing system adapted to perform the method or as part of tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIGS. 5a-5c are diagrams illustrating a first example implementation of VILTC with a protected initialization vector.

FIGS. 6a-6c are diagrams illustrating a second example implementation of VILTC with a protected initialization vector.

FIGS. 7 and 8 are flowcharts illustrating generalized techniques for authenticated encryption and decryption, respectively, with associated data using a VILTC.

FIGS. 9-11 are pseudocode listings illustrating aspects of theoretical justifications for some of the innovations described herein.

DETAILED DESCRIPTION

Figure 1:
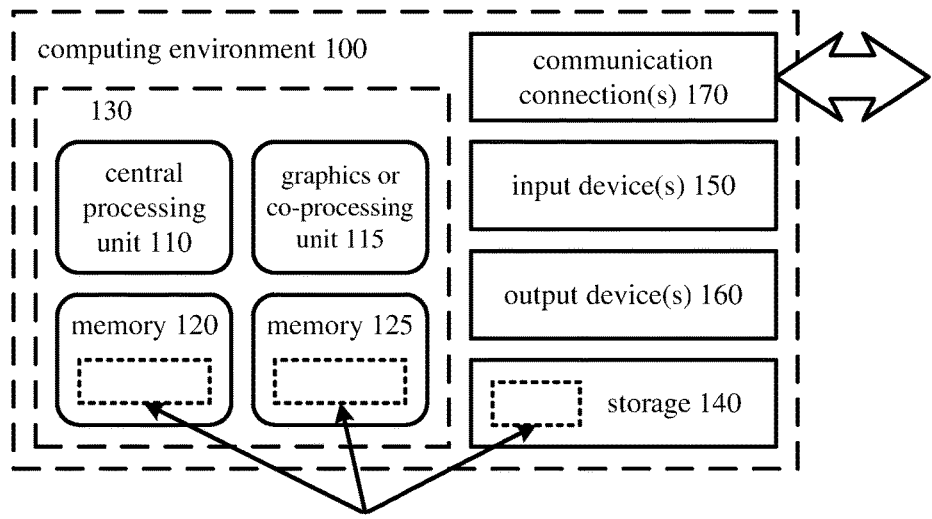
FIG. 1 is a diagram illustrating a generalized computing system in which some embodiments described herein can be implemented.

The detailed description presents innovations in the construction and use of variable-input-length tweakable ciphers ("VILTCs"). In some cases, these VILTCs use an initialization vector that is protected from exposure outside an encryption/decryption system in order to provide enhanced security with efficient performance. In other cases, a VILTC is used for a reliable and efficient implementation of authenticated encryption/decryption with associated data.

According to one aspect of the innovations described herein, a VILTC uses a protected initialization vector ("IV"). In some examples, constructing a VILTC with a protected IV offers a simple, modular approach for building a length-preserving, tweakable cipher that (1) may take plaintext inputs of essentially any length, (2) achieves the strongest possible security property for this type of primitive (that of being a strong, tweakable-pseudorandom permutation ("STPRP"), and (3) can be implemented with n-bit primitives so as to make the VILTC with protected IV STPRP-secure well beyond the "birthday-bound" of $2^{n/2}$ invocations of the VILTC with protected IV. (The term birthday-bound refers to a level of security against attacks. For a VILTC construction with birthday-bound security, security guarantees are dramatically weakened by the time $2^{n/2}$ bits have been enciphered. A VILTC construction with beyond-birthday-bound security may remain secure long after $2^{n/2}$ bits have been enciphered.) By some measures of efficiency, beyond-birthday secure instantiations of a VILTC with protected IV are competitive with existing constructions that are only secure to the birthday bound.

A VILTC with protected IV has many cryptographic applications. In particular, in lame-scale data-at-rest scenarios, where the amount of data to be protected by a single key is typically greater than in scenarios where keys can be easily renegotiated, a VILTC with protected IV can efficiently provide a suitable level of security. For example, a VILTC with protected IV can be used for full-disk encryption ("FDE") and decryption, format-preserving encryption ("FPE") and decryption, or authenticated encryption with associated data ("AEAD") and decryption. Alternatively, a VILTC with protected IV can be used for another encryption/decryption application.

According to another aspect of the innovations described herein, a tweakable cipher is used for AEAD and corresponding decryption. A VILTC used for AEAD can be instantiated using a protected IV construction or some other VILTC construction. Using a tweakable cipher for AEAD can provide many advantages. For example, using a tweakable cipher for AEAD can help securely handle the reporting of multiple types of decryption errors. It can also eliminate ciphertext expansion by exploiting any existing nonces, randomness, or redundancies appearing in either the plaintext or associated data inputs. Using a VILTC with a protected IV (with appropriate setting of its parameters) enables AEAD schemes with beyond birthday-bound security.

Various alternatives to the examples described herein are possible. Various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for constructing or using a VILTC, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) (also called computer-readable storage) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for constructing or using a VILTC.

The input device(s) (150) may be a touch input device such as a keyboard, mouse, pen, or trackball, a voice input device, touchscreen for receiving gesture input, a scanning device, or another device that provides input to the computing system (100). The output device(s) (160) may be a display (e.g., touchscreen), printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation.

II. Example Architectures for Construction or Use of VILTCs.

Figure 2:
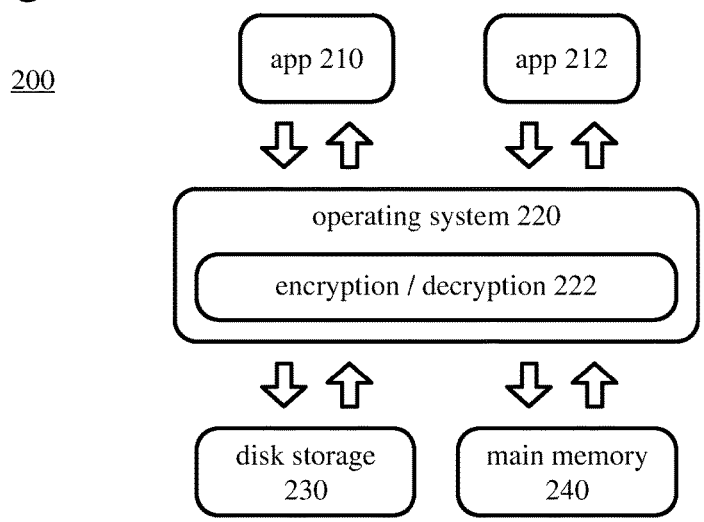
FIG. 2 is a diagram illustrating an example architecture for construction and use of VILTCs.

FIG. 2 shows an example architecture (200) for construction and use of VILTCs. In particular, the architecture includes an encryption/decryption service (222) that uses VILTCs.

In FIG. 2, the applications (210, 212) represent software that interacts with the operating system (220). The applications (210, 212) can include a database transaction processing or analysis application, a Web browser, a word processor or other productivity software (with file explorer functionality), a message service or any other type of application that uses encryption or decryption. Although FIG. 2 shows two applications, the architecture (200) can include more or fewer applications.

The applications (210, 212) interact with the operating system (220) to use the encryption/decryption service (222). When requested by one of the applications (210, 212) or the operating system (220), the encryption/decryption service (222) can encrypt data that is stored in the disk storage (230) or main memory (240) (e.g., for a database). Conversely, the encryption/decryption service (222) can decrypt the data that is requested by one of the applications (210, 212) or the operating system (220). For example, for full-disk encryption ("FDE"), the encryption/decryption service (222) transparently encrypts data stored in the disk storage (230) and decrypts data returned from the disk storage (230). Or, for format-preserving encryption ("FPE"), the encryption/decryption service (222) encrypts data stored in disk storage (230) or main memory (240) so that it has the same format as unencrypted data. For example, data such as credit card numbers are encrypted such that the encrypted values are still formatted as credit card numbers. As another example, for authenticated encryption with associated data ("AEAD"), the encryption/decryption service (222) encrypts messages having headers for one of the applications (210, 212), and decrypts encrypted messages for one of applications (210, 212).

III. Notation and Principles.

This section explains the notation used in the rest of the detailed description. It also explains principles of operation for certain aspects of the encryption/decryption systems described herein.

In general, $\mathbb{N} = \{0,1,2, \ldots \}$ represents a set of non-negative integers. For $n \in \mathbb{N}$ (a number n that is a member of the set $\mathbb{N}$), $\{0,1\}^n$ denotes the set of all n-bit binary strings, and $\{0,1\}^*$ denotes the set of all (finite) binary strings. The symbol E indicates the empty string.

Suppose the strings s and t are finite binary strings (that is, $s, t \in \{0,1\}^*$). The value $|s|$ is the length of s in bits. The value $|(s, t)| = |s||t|$, where $s\|t$ denotes the string formed by concatenating the strings s and t. If $s \in \{0,1\}^{nm}$, for some $m \in \mathbb{N}$, the expression $$s_1 s_2 \ldots s_m \xleftarrow{n} s$$

indicates that each $s_i$ is defined so that the length $|s_i| = n$, and $s = s_1 s_2 \ldots s_m$. When n is implicit from context, it may be omitted from the notation, If $s = b_1 b_2 \ldots b_n$ is an n-bit string (each $b_i \in \{0,1\}$), then the part of the string $s[i \ldots j] = b_i b_{i+1} \ldots b_j$, the part of the string $s[i \ldots ] = s[i \ldots n]$, and the part of the string $s[ \ldots j] = s[1 \ldots j]$.

The string $s \oplus t$ is the bitwise exclusive—or ("XOR") of the strings s and t. If, for example, $|s| < |t|$, then $s \oplus t$ is the bitwise XOR of s and $t[ \ldots |s|]$.

Given $R \subseteq \mathbb{N}$ and $n \in \mathbb{N}$ with $n \leq \min(R)$, the strings $\{0,1\}^R = \cup_{i \in R}\{0,1\}^i$, and by abuse of notation $\{0,1\}^{R-n} = \cup_{i \in R}\{0,1\}^{i-n}$. Given a finite set $\mathcal{X}$, the expression $$X \xleftarrow{\$} \mathcal{X}$$

indicates that the random variable X is sampled uniformly at random from $\mathcal{X}$. Throughout, the distinguished symbol ⊥ is assumed not to be part of any set except $\{\bot\}$. Given an integer n known to be in some range, $\langle n \rangle$ denotes some fixed-length (e.g., 64-bit) encoding of n. For example, $\langle 0 \rangle$ can indicate a 64-bit encoding of the value 0.

The function $H: \mathcal{K} \times \mathcal{D} \to \mathcal{R} \subseteq \{0,1\}^*$. Writing its first argument as a subscripted key, the function H is $\in$-almost universal ($\in$-AU)) if, for all distinct values of, $Y \in \mathcal{D}$, the probability $\Pr[H_K(Y)] \leq \in$ (where the probability is over $$K \xleftarrow{\$} \mathcal{K}).$$

Similarly, the function H is $\in$-almost 2-XOR universal if, for all distinct X, $Y \in \mathcal{D}$ and $C \in \mathcal{R}$, the probability $\Pr[H_K(X) \oplus H_K(Y) = C] \leq \in$.

An adversary is an algorithm taking zero or more oracles as inputs, which the adversary queries in a black-box manner before returning some output. Adversaries may be random.

The notation $A^f \Rightarrow b$ denotes the event that an adversary A outputs b after running with oracle $f$ as its input.

Sometimes it will be convenient to give pseudocode descriptions of the oracles with which an adversary can interact, as well as procedures that set up or otherwise relate to such interactions. These descriptions will be referred to as games. A game includes a set of procedures, including a special "Main" procedure that takes an adversary A as input. $\Pr[G(A) \Rightarrow y]$ is the probability that the Main procedure of game G outputs y when given an adversary A as input. When no Main procedure is explicitly given, Main(A) simply executes A, providing it with the remaining procedures as oracles (in some order that will be clear from context), and then returns A's output.

$\mathcal{K}$ is a non-empty set, and the strings $\mathcal{T}, \mathcal{X} \subseteq \{0,1\}^*$. A tweakable cipher is a mapping $\tilde{E}: \mathcal{K} \times \mathcal{T} \times \mathcal{X} \to \mathcal{X}$ with the property that, for all $(K,T) \in \mathcal{K} \times \mathcal{T}$, the tweakable cipher $\tilde{E}(K,T,\bullet)$ is a permutation on $\mathcal{X}$. The key is typically indicated as a subscript, so that $\tilde{E}_K(T, X) = \tilde{E}(K, T, X)$. The tweakable cipher $\tilde{E}_K(T,\bullet)$ is invertible as shown $\tilde{E}_K^{-1}(T,\bullet)$. $\mathcal{K}$ indicates the key space, $\mathcal{T}$ indicates the tweak space, and $\mathcal{X}$ indicates the message space. The tweakable cipher $\tilde{E}$ is length preserving if $|\tilde{E}_K(T, X)| = |X|$, for all $X \in \mathcal{X}$, $T \in \mathcal{T}$ and $K \in \mathcal{K}$. Restricting the tweak or message spaces of a tweakable cipher gives rise to other objects. When the message space $\mathcal{X} = \{0,1\}^n$, for some n>0, then $\tilde{E}$ is a tweakable block cipher ("TBC") with block size n. More generally, an n-character TBC $\tilde{E}$ is a family of permutations over the message space $\mathcal{X} = \Sigma^n$, where each permutation in the TBC is associated with a key and a tweak. When $|\mathcal{T}|=1$, the tweak is implicit, giving a cipher E: $\mathcal{K} \times \mathcal{X} \to \mathcal{X}$, where $E_K(\bullet)$ is a (length-preserving) permutation over $\mathcal{X}$, and $E_K^{-1}$ is its inverse. Finally, when the message space $\mathcal{X} = \{0,1\}^n$ and $|\mathcal{T}|=1$, the conventional block cipher E: $\mathcal{K} \times \{0,1\}^n \to \{0,1\}^n$.

The value N (upper case) indicates the length of an input string for an N-bit TBC or N-character TBC, or the length of an IV for a VILTC. The N-bit TBC and VILTC can be constructed from n-bit block ciphers, where n (lower case) indicates block size for the block cipher. In some examples, N=n. In other examples, N=2n.

Perm($\mathcal{X}$) denotes the set of all permutations on $\mathcal{X}$. BC($\mathcal{K}, \mathcal{X}$) is the set of all ciphers with key space $\mathcal{K}$ and message space $\mathcal{X}$. When $\mathcal{X}, \mathcal{X}'$ are sets, Func($\mathcal{X}, \mathcal{X}'$) is the set of all functions $f: \mathcal{X} \to \mathcal{X}'$. A tweakable cipher $\tilde{E}: \mathcal{K} \times \mathcal{T} \times \mathcal{X} \to \mathcal{X}$. The tweakable pseudorandom-permutation ("TPRP") and strong-TPRP ("STPRP") advantage measures are:

$$Adv_{\tilde{E}}^{\widetilde{prp}}(A) = Pr\left[K \xleftarrow{\$} \mathcal{K}: A^{\tilde{E}_K(\cdot)} \Rightarrow 1\right] - Pr\left[\Pi \xleftarrow{\$} BC(\mathcal{T}, \mathcal{X}): A^{\Pi(\cdot)} \Rightarrow 1\right]$$

$$Adv_{\tilde{E}}^{\widetilde{sprp}}(A) =$$
$$Pr\left[K \xleftarrow{\$} \mathcal{K}: A^{\tilde{E}_K(\cdot), \tilde{E}_K^{-1}(\cdot)} \Rightarrow 1\right] - Pr\left[\Pi \xleftarrow{\$} BC(\mathcal{T}, \mathcal{X}): A^{\Pi(\cdot), \Pi^{-1}(\cdot)} \Rightarrow 1\right],$$

where, in each case, adversary A takes the indicated number of oracles. For both the TPRP and STPRP experiments, the adversary A never repeats a query to an oracle. For the STPRP advantage measure, this also means that if the adversary A queries (T, X) to its leftmost oracle and receives Y in return, then adversary A never queries (T, Y) to its rightmost oracle, and vice versa.

A related measure, the SRND advantage, is defined as:

$$Adv_E^{\widetilde{srnd}}(A) = Pr\left[K \xleftarrow{\$} \mathcal{K}: A^{\tilde{E}_K(\cdot), \tilde{E}_K^{-1}(\cdot)} \Rightarrow 1\right] - Pr[A^{\$(\cdot,\cdot), \$(\cdot,\cdot)} \Rightarrow 1],$$

where the $(\bullet,\bullet)$ oracle outputs a random string equal in length to its second input: $|\$(T, X)|=|X|$ for all T and X. Adversaries for the above three advantages are nonce-respecting if the transcript of their oracle queries $(T_1, X_1), \ldots, (T_q, X_q)$ does not include $T_i=T_j$ for any $i \neq j$.

For a cipher E: $\mathcal{K} \times \mathcal{X} \to \mathcal{X}$, the pseudorandom permutation ("PRP") and strong-PRP ("SPRP") advantage measures are defined as:

$$Adv_E^{prp}(A) = Pr\left[K \xleftarrow{\$} \mathcal{K}: A^{E_K(\cdot)} \Rightarrow 1\right] - Pr\left[\pi \xleftarrow{\$} Perm(\mathcal{X}): A^{\pi(\cdot)} \Rightarrow 1\right]$$

$$Adv_E^{sprp}(A) =$$
$$Pr\left[K \xleftarrow{\$} \mathcal{K}: A^{E_K(\cdot), E_K^{-1}(\cdot)} \Rightarrow 1\right] - Pr\left[\pi \xleftarrow{\$} Perm(\mathcal{X}): A^{\pi(\cdot), \pi^{-1}(\cdot)} \Rightarrow 1\right],$$

where, in each case, adversary A takes the indicated number of oracles.

Three adversarial resources are tracked: the time complexity t, the number of oracle queries q, and the total length of these queries μ. The time complexity of the adversary A is defined to include the complexity of its enveloping probability experiment (including sampling of keys, oracle computations, etc.), and the parameter t is defined to be the maximum time complexity of the adversary A, taken over both experiments in the advantage measure.

IV. Generalized Constructions and Uses for VILTCs with Protected IVs.

Figure 3A:
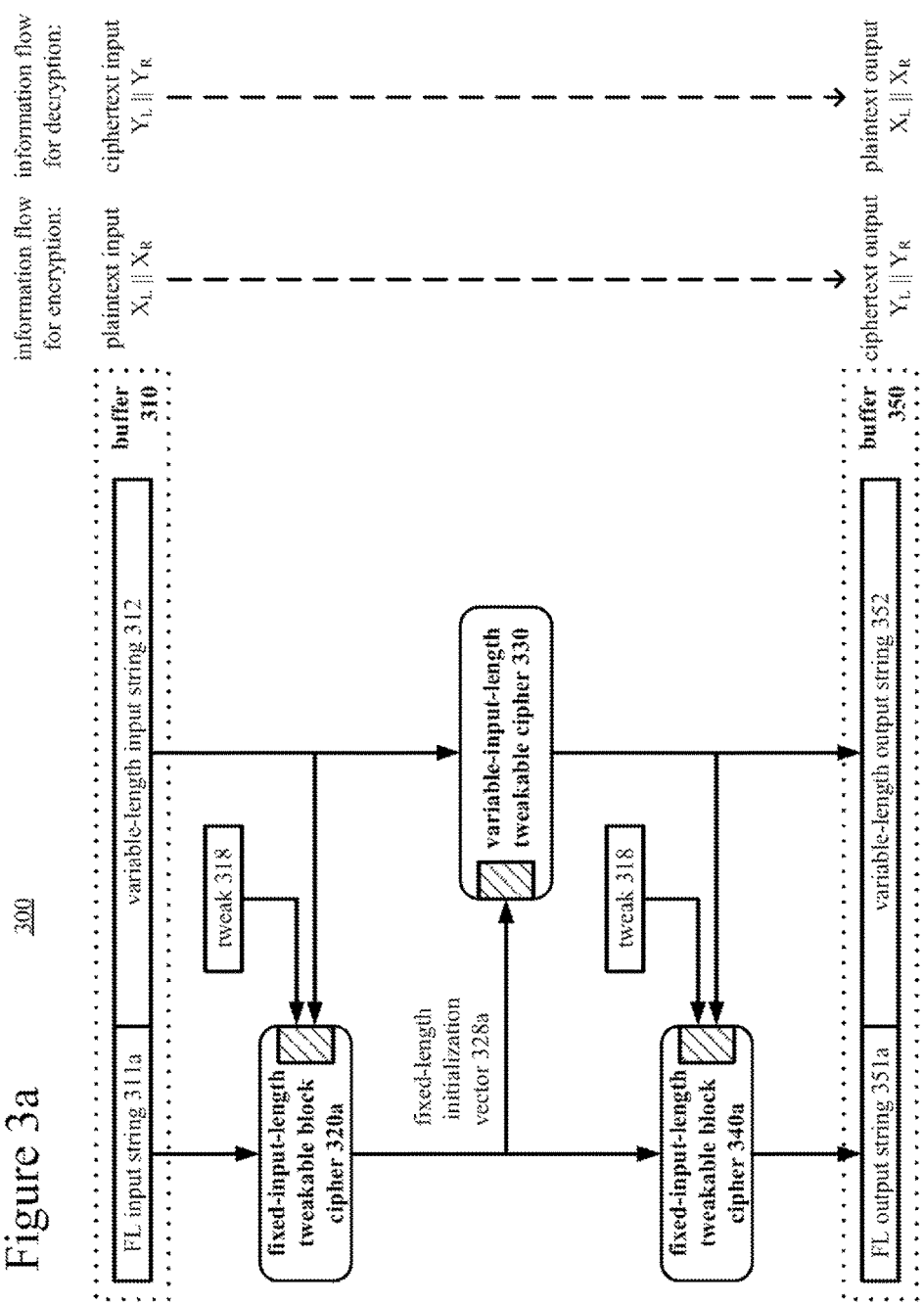
FIGS. 3a-3c are diagrams illustrating generalized constructions of a VILTC with a protected initialization vector.
Figure 3B:
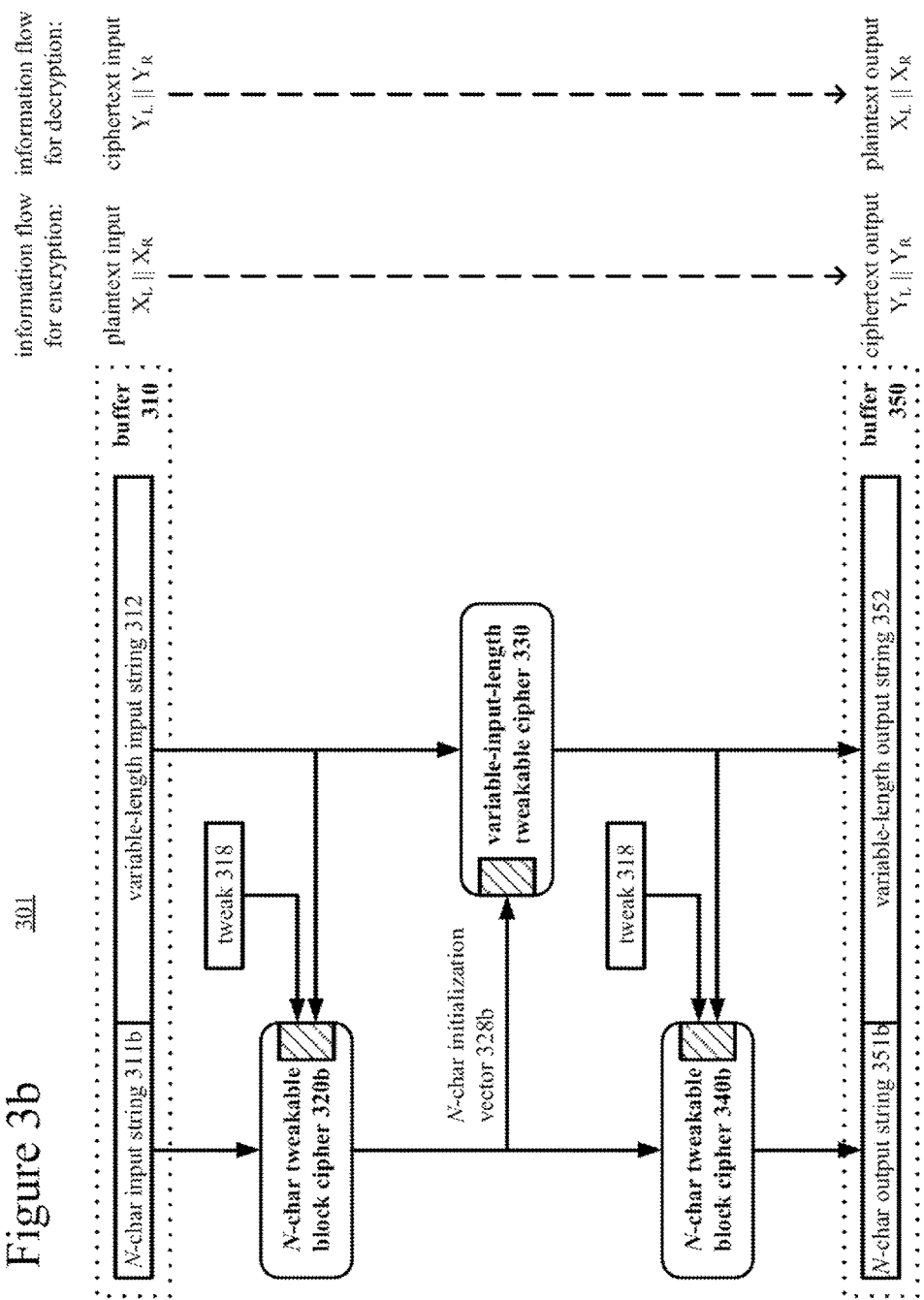
Figure 3C:
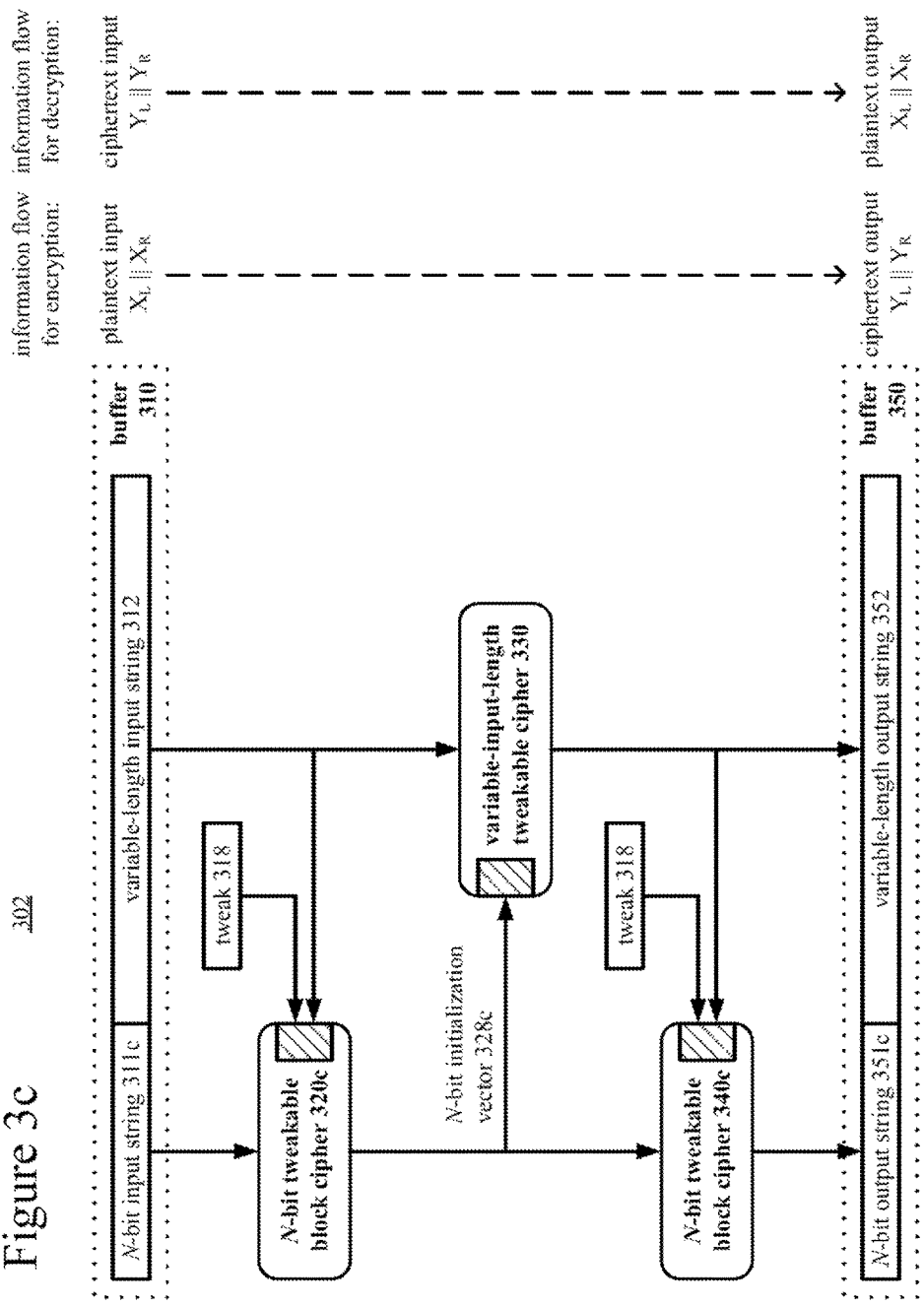

FIGS. 3a-3c show generalized constructions (300, 301, 302) of a VILTC with a protected initialization vector. The generalized constructions (300, 301, 302) can be used for encryption, in which a fixed-length input string $X_L$ and variable-length input string $X_R$ of plaintext are converted to a fixed-length output string $Y_L$ and variable-length output string $Y_R$ of ciphertext. Or, the generalized constructions (300, 301, 302) can be used for decryption, in which a fixed-length input string $Y_L$ and variable-length input string $Y_R$ of ciphertext are converted to a fixed-length output string $X_L$ and variable-length output string $X_R$ of plaintext.

In the construction (300) of FIG. 3a, a first FIL TBC (320a) and second FIL TBC (340a) protect the fixed-length initialization vector (328a) from exposure outside the system. A buffer (310) stores a fixed-length input string (311a) and a variable-length input string (312). A first FIL TBC (320a) is adapted to produce the fixed-length initialization vector (328a). For example, the first FIL TBC (320a) is adapted to produce the fixed-length initialization vector (328a) using the fixed-length input string (311a), as its input, and a combination (e.g., concatenation or other adjustment) of a tweak (318) for the system and the variable-length input string (312), as its tweak. In FIG. 3a, the filled-in portion of the first FIL TBC (320a) (and the second FIL TBC (340a)) represents the tweak input. The value of the tweak (318) can be based on an environmental feature of the system (e.g., logical hard disk sector ID for FDE, memory address, last four digits of a credit card number for FPE).

In FIG. 3a, the variable-input-length tweakable cipher ("VILTC") (330) is adapted to produce a variable-length output string (352) using the fixed-length initialization vector (328a) as a tweak. For example, the VILTC (330) is adapted to produce the variable-length output string (352)

using the fixed-length initialization vector (328*a*), as its tweak, and the variable-length input string (312), as its input.

In FIG. 3*a*, the second FIL TBC (340*a*) is adapted to produce a fixed-length output string (351*a*). For example, the second FIL TBC (340*a*) is adapted to produce the fixed-length output string (351*a*) using the fixed-length initialization vector (328*a*), as its input, and a combination (e.g., concatenation or other adjustment) of the tweak (318) and the variable-length output string (352), as its tweak. Typically, the first FIL TBC (320*a*) and the second FIL TBC (340*a*) use the same value for the tweak (318). Another buffer (350) stores the fixed-length output string (351*a*) and the variable-length output string (352).

FIG. 3*b* shows a variation of the construction (300) that is adapted for format-preserving encryption and decryption. In the construction (301) of FIG. 3*b*, a first N-character TBC (320*b*) and second N-character TBC (340*b*) protect the N-character initialization vector (328*b*) from exposure outside the system. A buffer (310) stores an N-character input string (311*b*) and a variable-length input string (312). A first N-character TBC (320*b*) is adapted to produce the N-character initialization vector (328*b*). For example, the first N-character TBC (320*b*) is adapted to produce the N-character initialization vector (328*b*) using the N-character input string (311*b*), as its input, and a combination (e.g., concatenation or other adjustment) of a tweak (318) for the system and the variable-length input string (312), as its tweak. The value of the tweak (318) can be based on an environmental feature of the system (e.g., last four digits of a credit card number for FPE).

In FIG. 3*b*, the VILTC (330) is adapted to produce a variable-length output string (352) using the N-character initialization vector (328*b*) as a tweak. For example, the VILTC (330) is adapted to produce the variable-length output string (352) using the N-character initialization vector (328*b*), as its tweak, and the variable-length input string (312), as its input.

In FIG. 3*b*, the second N-character TBC (340*b*) is adapted to produce an N-character output string (351*b*). For example, the second N-character TBC (340*b*) is adapted to produce the N-character output string (351*b*) using the N-character initialization vector (328*b*), as its input, and a combination (e.g., concatenation or other adjustment) of the tweak (318) and the variable-length output string (352), as its tweak. Typically, the first N-character TBC (320*b*) and the second N-character TBC (340*b*) use the same value for the tweak (318) for the system. Another buffer (350) stores the N-character output string (351*b*) and the variable-length output string (352).

Characters of the N-character input string (311*b*), the variable-length input string (312), the N-character output string (351*b*), and the variable-length output string (352) are selected from a pre-determined, finite set of symbols (e.g., numbers 0 . . . 9, letters A . . . Z and numbers 0 . . . 9). Example values of N for an N-character input string (311*b*), N-character initialization vector (328*b*), and N-character output string (351*b*) are N=1 or N=2. More generally, N can be any positive integer.

The generalized construction (301) can be implemented in various ways. For example, the first N-character TBC (320*b*), the VILTC (330) and the second N-character TBC (340*b*) can be constructed from randomly generated permutation look-up tables. Recall that, in general, each permutation in a TBC is associated with a tweak and a key. The tweak and the key, as inputs to the TBC, specify a particular permutation for the TBC. In some implementations (e.g., for FPE applications in the credit-card payment industry, where regulatory pressures are strong), users may prefer to avoid explicit keys. In such cases, the tweak is used to select among a family of randomly generated permutation look-up tables.

More generally, the first N-character TBC (320*b*), the second N-character TBC (340*b*), and the VILTC (330) can be implemented using special-purpose hardware or implemented using software that executes on general-purpose hardware. Typically, the two N-character TBCs (320*b*, 340*b*) are provided through two calls to a single N-character TBC component, with different inputs and outputs as described above. Alternatively, however, the N-character TBCs (320*b*, 340*b*) can be provided with two different N-character TBC components.

FIG. 3*c* shows a variation of the construction (300) that is adapted for full-disk encryption and decryption. In the construction (302) of FIG. 3*c*, a first N-bit TBC (320*c*) and second N-bit TBC (340*c*) protect the N-bit initialization vector (328*c*) from exposure outside the system. A buffer (310) stores an N-bit input string (311*c*) and a variable-length input string (312). Example values of N are 128 and 256 bits. Example length values for the variable-length input string (312) are 4096 bytes and 8192 bytes.

In FIG. 3*c*, a first N-bit TBC (320*c*) is adapted to produce an N-bit initialization vector (328*c*). For example, the first N-bit TBC (320*c*) is adapted to produce the N-bit initialization vector (328*c*) using the N-bit input string (311*c*), as its input, and a combination (e.g., concatenation or other adjustment) of a tweak (318) for the system and the variable-length input string (312), as its tweak. The value of the tweak (318) can be based on an environmental feature of the system (e.g., logical hard disk sector ID for FDE).

In FIG. 3*c*, the VILTC (330) is adapted to produce a variable-length output string (352) using the N-bit initialization vector (328*c*) as a tweak. For example, the VILTC (330) is adapted to produce the variable-length output string (352) using the N-bit initialization vector (328*c*), as its tweak, and the variable-length input string (312), as its input.

In FIG. 3*c*, the second N-bit TBC (340*c*) is adapted to produce an N-bit output string (351*c*). For example, the second N-bit TBC (340*c*) is adapted to produce the N-bit output string (351*c*) using the N-bit initialization vector (328*c*), as its input, and a combination (e.g., concatenation or other adjustment) of the tweak (318) and the variable-length output string (352), as its tweak. Typically, the first N-bit TBC (320*c*) and the second N-bit TBC (340*c*) use the same value for the tweak (318) for the system. Another buffer (350) stores the N-bit output string (351*c*) and the variable-length output string (352).

The generalized construction (302) can be implemented in many ways, as detailed below. The first N-bit TBC and the second N-bit TBC have identical structure. Alternatively, they have different structures.

For example, in one implementation, the first N-bit TBC (320*c*) and/or the second N-bit TBC (340*c*) is an LRW2 TBC construction (defined below; see section V.A), and the VILTC (330) is an iterated LRW2 TBC construction. As further detailed below, a LRW2 TBC construction is adapted to produce an n-bit LRW2 output string by computing an XOR between (1) an encrypted version of an XOR between (a) an n-bit LRW2 input string and (b) an n-bit hash of a tweak input, and (2) the n-bit hash of the tweak input. As another example, in another implementation, the first N-bit TBC (320*c*) and/or the second N-bit TBC (340*c*) is a domain-extended CLRW2 construction (defined below; see section V.A), and the VILTC (330) is an iterated CLRW2 construction.

The construction (302) can include a controller (not shown) that is adapted to adjust N (number of bits for the fixed-length input string and fixed-length output string) to trade off security and implementation efficiency. A smaller value of N (e.g., 128) provides worse security but simplifies efficient implementation subject to security constraints. On the other hand, a larger value of N (e.g., 256) provides better security but complicates efficient implementation subject to the security constraints.

In general, N can be any positive integer. The numbers N=128 and N=256 are suitable when the FIL and VIL components of the protected IV construction are constructed from an underlying 128-bit block cipher (e.g., AES). If the PIV construction is implemented using block ciphers of another size (such as DES, with block size of 64 bits), another value for N may be suitable (e.g., 64 or 128 bits).

The first N-bit TBC (320c), second N-bit TBC (340c), and VILTC (330) can be implemented using special-purpose hardware. Or, the first N-bit TBC (320c), second N-bit TBC (340c), and VILTC (330) can be implemented using software that executes on general-purpose hardware. Typically, the two N-bit TBCs (320c, 340c) are provided through two calls to a single N-bit TBC component, with different inputs and outputs as described above. Alternatively, however, the N-bit TBCs (320c, 340c) can be provided with two different N-bit TBC components.

The construction (302) can be interpreted as a type of three-round, unbalanced Feistel network, where the left part of the input is of a fixed bit length N, and the right part has variable length. The first and third round-functions are the N-bit TBCs ($\tilde{F}$) (320c, 340c). In example implementations, the bit length N is a tunable parameter of the construction, and can have a value such as N=128 or N=256. The VILTC (330) provides a middle round-function ($\tilde{V}$), whose tweak is the output of first round, the initialization vector (328c).

Compared to a conventional VILTC $\tilde{V}$ without a protected IV, the VILTC module $\tilde{V}$ in a VILTC with protected IV (PIV[$\tilde{F}$, $\tilde{V}$]) can have lower security requirements. The target security property for PIV[$\tilde{F}$, $\tilde{V}$] is being STPRP-secure. Informally, being STPRP-secure means withstanding chosen-ciphertext attacks in which the attacker also has full control over all inputs. The attacker can, for example, repeat a tweak an arbitrary number of times. As detailed in section VII, if a TBC $\tilde{F}$ is STPRP-secure over a domain of N-bit strings, and a tweakable cipher $\tilde{V}$ is secure against attacks that never repeat a tweak, then PIV[$\tilde{F}$, $\tilde{V}$] is STPRP-secure. Qualitatively, the protected IV construction promotes security (over a large domain), against a restricted kind of attacker, into security against arbitrary chosen-ciphertext attacks. Quantitatively, the security bound for PIV[$\tilde{F}$, $\tilde{V}$] contains an additive term $q^2/2^N$, where q is the number of times PIV[$\tilde{F}$, $\tilde{V}$] is queried. N can be the block size n of some underlying block cipher. In this case, the PIV[$\tilde{F}$, $\tilde{V}$] delivers a bound comparable to those achieved by existing constructions. If N=2n, an n-bit primitive can be used to instantiate $\tilde{F}$ and $\tilde{V}$, and yet PIV[$\tilde{F}$, $\tilde{V}$] delivers a tweakable cipher with security well beyond beyond-birthday of $2^{n/2}$ queries.

Formally, in example implementations, PIV[$\tilde{F}$, $\tilde{V}$] is constructed based on the following. The tweak space $\mathcal{T} = \{0,1\}^t$ for some t≥0. $\mathcal{Y} \subseteq \{0,1\}^*$, such that if $Y \in \mathcal{Y}$, then $\{0,1\}^{|Y|} \subseteq \mathcal{Y}$. $T' = \mathcal{T} \times \mathcal{Y}$. For an integer N>0, the TBC $\tilde{F}: \mathcal{K}' \times \mathcal{T}' \times \{0,1\}^N \to \{0,1\}^N$, and the VILTC $\tilde{V}: \mathcal{K} \times \{0,1\}^N \times \mathcal{Y} \to \mathcal{Y}$. From these, PIV[$\tilde{F}$, $\tilde{V}$]: $(\mathcal{K}' \times \mathcal{K}) \times \mathcal{T} \times \mathcal{X} \to \mathcal{X}$, where $\mathcal{X} = \{0,1\}^N \times \mathcal{Y}$.

The PIV composition of $\tilde{F}$, $\tilde{V}$ is a three round Feistel construction, working as follows. On input (T,X), the plaintext input string $X=X_L \| X_R$ where the length of the fixed-length part $|X_L|=N$. The first TBC $\tilde{F}$, using a key K', creates an N-bit string for the initialization vector IV=$\tilde{F}_{K'}(T\|X_R, X_L)$. Next, the VILTC $\tilde{V}$ uses this IV to encipher the variable-length input string $X_R$ with a key K, creating a variable-length output string $Y_R = \tilde{V}_K(IV, X_R)$. The second TBC $\tilde{F}$ creates an N-bit output string $Y_L = \tilde{F}_{K'}(T\|Y_R, IV)$. The ciphertext output string $Y_L \| Y_R$ is returned as the value of PIV[$\tilde{F}, \tilde{V}$]$_{K',K}$(T, X).

Conversely, the inverse construction PIV[$\tilde{F}, \tilde{V}$]$_{K',K}^{-1}$(T, Y) operates as follows. On input (T,Y), the ciphertext input string $Y = Y_L \| Y_R$ where the length of the fixed-length part $|Y_L|=N$. The first TBC $\tilde{F}$, using a key K', creates an N-bit string for the initialization vector IV=$\tilde{F}_{K'}(T\|Y_R, Y_L)$. Next, the VILTC $\tilde{V}$ uses this IV to decipher the variable-length input string $Y_R$ with a key K, creating a variable-length output string $X_R = \tilde{V}_K(IV, Y_R)$. The second TBC $\tilde{F}$ creates an N-bit output string $X_L = \tilde{F}_{K'}(T\|X_R, IV)$. The plaintext output string $X_L \| X_R$ is returned as the value of PIV[$\tilde{F}, \tilde{V}$]$_{K',K}^{-1}$(T, Y).

In FIG. 3c, the construction includes three rounds. Alternatively, the construction can include more rounds (e.g., 5 rounds or 7 rounds), with N-bit TBCs ($\tilde{F}$) starting and ending the construction, and with multiple VILTC $\tilde{V}$ components alternating among the N-bit TBCs ($\tilde{F}$).

Figure 4:
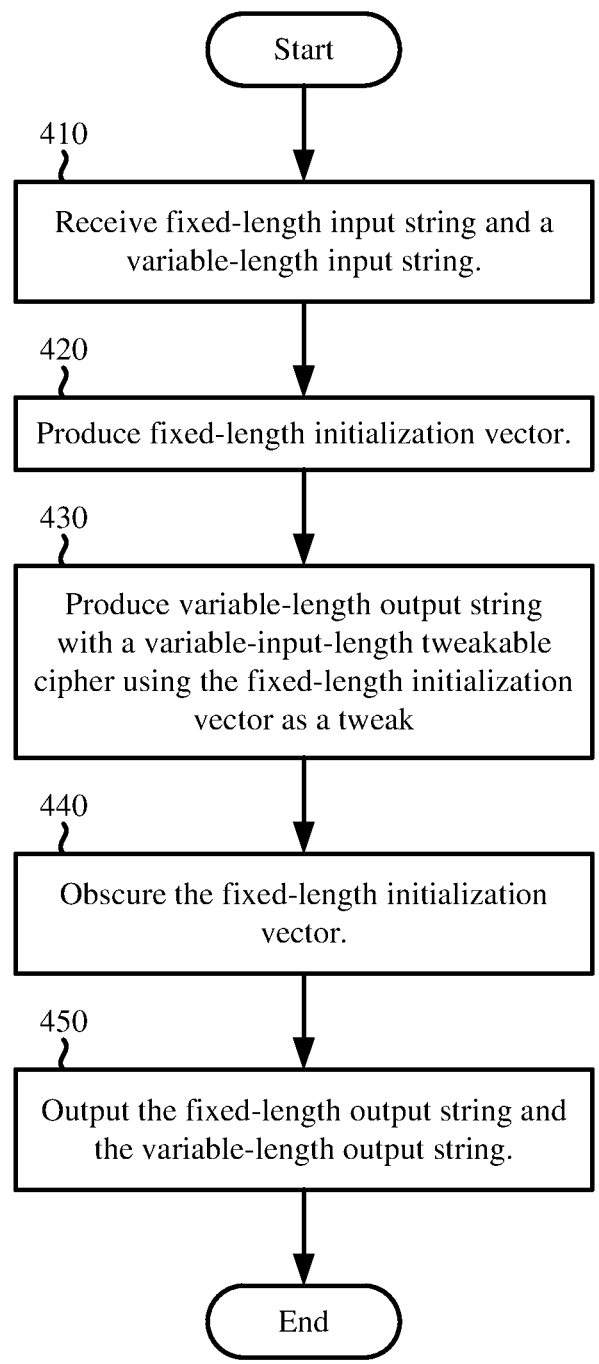
FIG. 4 is a flowchart illustrating a generalized technique for using a VILTC with a protected initialization vector.

FIG. 4 shows a generalized technique (400) for using a VILTC with a protected IV. An encryption system or decryption system performs the technique (400).

The system receives (410) a fixed-length input string (e.g., N-bit input string, N-character input string) and a variable-length input string. For encryption (e.g., during FDE, FPE, AEAD or another encryption scenario), the fixed-length input string and the variable-length input string are plaintext. For corresponding decryption, the fixed-length input string and the variable-length input string are ciphertext.

The system produces (420) a fixed-length initialization vector (e.g., N-bit initialization vector, N-character initialization vector). For example, the fixed-length initialization vector is produced with a FIL TBC based on the fixed-length input string, as input for the FIL TBC, and a combination of a tweak for the system and the variable-length input string, as tweak for the FIL TBC. The FIL TBC can be an N-bit TBC or N-character TBC, for example. For the FIL TBC, the system can set the value of the tweak based on an environmental feature of the system (e.g., disk sector, memory address) or set the value of the tweak in some other way. Alternatively, the fixed-length initialization vector is produced in some other way.

The system also produces (430) a variable-length output string with a VILTC, which uses the fixed-length initialization vector as a tweak. For example, the VILTC produces the variable-length output string based on the fixed-length initialization vector (as tweak for the VILTC) and the variable-length input string (as input for the VILTC). Alternatively, the variable-length output string is produced in some other way.

The system obscures (440) the fixed-length initialization vector. For example, the fixed-length initialization vector is obscured by a FIL TBC, which produces a fixed-length output string (e.g., N-bit output string, N-character output string) based on the fixed-length initialization vector, as input for the FIL TBC, and a combination of the system tweak and the variable-length output string, as tweak for the FIL TBC. The FIL TBC can be an N-bit TBC or N-character TBC, for example. Alternatively, the fixed-length initialization vector is obscured in some other way.

Finally, the system outputs (450) the fixed-length output string and the variable-length output string. For encryption (e.g., during FDE, FPE, AEAD or another encryption scenario), the fixed-length output string and the variable-length output string are ciphertext. For corresponding decryption, the fixed-length output string and the variable-length output string are plaintext.

V. Example Implementations for VILTCs with Protected IVs.

Within the general framework for VILTCs with protected IVs, the fixed-input length ("FIL") part $\tilde{F}$ and variable-input-length ("VIL") part $\tilde{V}$ can be constructed independently. This modular approach is beneficial since constructing efficient and secure instantiations of the VIL part $\tilde{V}$ is typically easy, when tweaks can be assumed not to repeat. Constructing a FIL TBC $\tilde{F}$ that remains secure when tweaks may be repeated is simplified by having it process plaintext inputs of a fixed bit length N (that is, N-bit block size). In practice, when N=128 or 256, inefficiencies incurred by $\tilde{F}$ can be offset by efficiency gains in $\tilde{V}$.

There are security advantages to setting the block size N to be as large as possible, but building a FIL TBC $\tilde{F}$ with domain $\{0,1\}^N$ for a large N, and for which $\text{Adv}_{\tilde{F}}^{\widetilde{\text{prp}}}(C)$ approaches $q^2/2^N$, is complicated. In particular, at present, there are no efficient constructions that permit $\text{Adv}_{\tilde{F}}^{\widetilde{\text{prp}}}(C)$ to be smaller than $\mathcal{O}(q^3/2^{2n})$ when using an n-bit block cipher as a starting point, although a construction for which N=2n is described below.

Therefore, this section focuses on constructing TBCs $\tilde{F}$ with a relatively small N (e.g., 128, 256). In particular, N-bit TBCs are constructed out of block ciphers. For n as the block size of the block cipher, N=n, and N=2n. This section describes two implementations of VILTCs with protected IVs, each using n-bit block ciphers.

The first example implementation (called $TCT_1$) provides birthday-bound security. When N=n, the implementation is secure up to roughly $q=2^{n/2}$, which is the birthday bound with respect to the block cipher. With this security bound in mind, the implementation uses simple and efficient constructions of both $\tilde{F}$ and $\tilde{V}$. $TCT_1$ uses only one block cipher invocation and some arithmetic, modulo a power of two, per n-bit block of input. In contrast, previous approaches to implementing VILTCs either use two block cipher invocations per n-bit block, or use per-block finite field operations.

The second example implementation (called $TCT_2$) delivers security beyond the birthday-bound. When N=2n, the implementation is secure up to roughly $q=2^n$ queries. With this tighter security bound in mind, there are still reasonably efficient constructions. When compared to previous VILTCs with only birthday-bound security, $TCT_2$ incurs only some additional, simple arithmetic operations per n bit block of input. Again, this arithmetic is performed modulo powers of two, rather than in a finite field.

In the $TCT_1$ and $TCT_2$ implementations, the VIL component $\tilde{V}$ is instantiated using counter-mode encryption over a TBC. The additional tweak input of the TBC permits various "tweak-scheduling" approaches, e.g., fixing a single per-message tweak across all blocks, or changing the tweak each message block. (There is a natural connection between changing the tweak of a TBC and changing the key of a block cipher. Both can be used to boost security, but changing a tweak is cleaner because tweaks need not be secret.) Re-tweaking on a block-by-block basis leads to a beyond birthday-bound secure VILTC with protected IV construction that admits strings of any length at least N.

The procedure TCTR provides counter-mode encryption over an n-bit TBC $\tilde{E}$. Within a call to TCTR, each n-bit block $X_i$ of the input X is processed using a per-block tweak $T_i$, which is determined by a function $g : \mathcal{T}' \times \mathbb{N} \to \mathcal{T}$ of the input tweak T and the block index i, as follows:

procedure $TCTR[\tilde{E}]_K(T, X)$:

$X_1, X_2, \ldots, X_v \xleftarrow{n} X$ for $i =$ to $v$ $T_i \leftarrow g(T, i); Z_i \leftarrow \langle i \rangle$ $Y_i \leftarrow \tilde{E}_K(T_i, Z_i) \oplus X_i$ Return $Y_1, Y_2, \ldots, Y_v$ In the procedure inverse TCTR, each n-bit block $Y_i$ of the input Y is processed using a per-block tweak $T_i$, as follows:

procedure $TCTR[\tilde{E}]_K^{-1}(T, Y)$:

$Y_1, Y_2, \ldots, Y_v \xleftarrow{n} Y$ for $i =$ to $v$ $T_i \leftarrow g(T, i); Z_i \leftarrow \langle i \rangle$ $X_i \leftarrow Y_i \oplus \tilde{E}_K(T_i, Z_i)$ Return $X_1, X_2, \ldots, X_v$ In a VILTC with protected IV, the TBC $\tilde{F}$ handles long tweaks. The tweaks can be compressed using an $\in$-AU hash function at the cost of adding a $q^2 \in$ term to the tweakable cipher's TPRP security bound. In particular, some example implementations use a variation of the NH hash. The function $NH[r, s]_L$ takes r-bit keys ($|L|=r$), maps r-bit strings to s-bit strings, and is $2^{s/2}$-AU. Given a TBC $\tilde{E}$, $\tilde{E}^{NH}$ denotes the resulting TBC whose tweak space is now the domain of NH, rather than its range.

A. Components of First and Second Example Implementations.

The first and/or second example implementations use the following components.

The component LRW2 indicates a birthday-bound TBC that uses a block cipher E and a $\in$-AXU$_2$ function H. $LRW2[H, E]_{(K,L)}(T,X) = E_K(X \oplus H_L(T)) \oplus H_L(T)$.

The component CLRW2 is a TBC with beyond birthday-bound security, which uses a block cipher E and a $\in$-AXU$_2$ function H. $CLRW2[H,E]_{(K_1,K_2,L_1,L_2)}(T,X) = LRW2[H,E]_{(K_2,L_2)}(T, LRW2[H,E]_{(K_1,L_1)}(T,X))$.

The component polyH$^{mn}$ is a $\in$-AXU$_2$ function with domain $(\{0,1\}^n)^m$ and $\in = m/2^n$. All operations are in $F_{2^n}$.

$$polyH_L^{mn}(T_1 T_2 \ldots T_m) = \bigoplus_{i=1}^{m} T_i \otimes L^i.$$

The component NH(vw, 2tw) is a $\in$-AXU$_2$ function with $\in = 1/2^{tw}$. Inputs are vw bits, where v is even and w>0 is fixed. $NH[v,t]_{K_1 \| \ldots \| K_{v+2(t-1)}}(M) = H_{K_1 \ldots K_v}(M) \| H_{K_3 \ldots K_{v+2}}(M) \| \ldots \| H_{K_{2t-1} \ldots K_{v+2t-2}}(M)$, where $H_{K_1 \| \ldots \| K_v}(X_1 \ldots X_v) = \sum_{i=1}^{v/2} (K_{2i-1} +_w X_{2i-1}) \cdot (K_{2i} +_w X_{2i}) \mod 2^{2w}$.

The component CDMS is a Feistel-like domain extender for TBC $\tilde{E}$. $CDMS[\tilde{E}]_K(T,L\|R) = \tilde{E}_K(10\|T\|R',L')\|R'$, where $R' = \tilde{E}_K(01\|T\|L',R)$ and $L' = \tilde{E}_K(00\|T\|R,L)$.

B. First Example Implementation $TCT_1$.

The first example implementation $TCT_1$ is an efficient implementation with birthday-type security for applications with small plaintext messages (e.g., FDE). For this implementation, the size of the N-bit TBC is $N=n$, and the n-bit TBC $\tilde{F}$ uses an LRW2 component. In addition to a block cipher E, LRW2[H, E] uses an $\in$-$AXU_2$ hash function H. In theory, the LRW2 component can accommodate large tweaks. For practical purposes, however, it will be more efficient to implement LRW2 with a small tweak space, and then extend this small tweak space using a fast $\in$-AU hash function. For the $\in$-$AXU_2$ hash function itself, the first example implementation uses the polynomial hash polyH.

FIGS. 5a-5c illustrate components of the first example implementation $TCT_1$ (500), which takes a tweak T and message X as inputs. The message X is split into blocks $X_1$, $X_2$, . . . , $X_v$, where the length of the all blocks except the last block $X_v$ is n, and the length of the last block $X_v$ is less than or equal to n. $TCT_1$ produces an output string $Y=Y_1$, $Y_2$, . . . , $Y_v$. The block size of the FIL components is $N=n$. For k, n>0, E: $\{0,1\}^k \times \{0,1\}^n \rightarrow \{0,1\}^n$ is a block cipher. $TCT_1$=PIV[$\tilde{F}$, $\tilde{V}$], where to obtain a τn-bit tweak space and domain $\{0,1\}^{\{n,n+1, \ldots, ln\}}$, the n-bit TBC $\tilde{F}$ and VILTC $\tilde{V}$ are set as follows.

The n-bit TBC $\tilde{F}$=LRW2[polyH$^{2n}$, E]$^{NH[(l+\tau)n,2n]}$. That is, the n-bit TBC $\tilde{F}$ is a LRW2 component with its tweak space extended using NH. The key space for $\tilde{F}$ is $\{0,1\}^k \times \{0,1\}^{2n} \times \{0,1\}^{(l+\tau)n}$, with key K' being partitioned into keys for E, polyH$^{2n}$, and NH[(l+τ)n, 2n]. Since NH supports only fixed-length inputs, NH inputs are implicitly padded with a 1 and then enough 0s to reach a total length of (l+τ)n bits.) The tweak space for $\tilde{F}$ is $\{0,1\}^{\{0,1,2, \ldots, (l+\tau-1)n\}}$.

FIG. 5a shows a first n-bit TBC $\tilde{F}'_{K'}$(520) that accepts a tweak input (510) and message input. The message input is the first n-bit block $X_1$. The tweak input (510) is a tweak value T concatenated with a padded version of the remaining blocks of the message X. The function Pad( ) maps s to s $\|10^{(l+1)n-1-|s|}$. The first n-bit TBC $\tilde{F}'_{K'}$ (520) produces an n-bit IV (538).

FIG. 5a also shows a second n-bit TBC $\tilde{F}'_{K'}$ (520) that accepts a tweak input (560) and message input. The message input is the n-bit IV (538). The tweak input (560) is the tweak value T concatenated with a padded version of blocks $Y_2 \ldots Y_v$ of the variable-length output string Y. The second n-bit TBC $\tilde{F}'_{K'}$ (520) produces the first block $Y_1$ of the variable-length output string Y.

FIG. 5b shows details of an n-bit TBC $\tilde{F}'_{K'}$ (520). The NH function (521) accepts a tweak value with (l+r)×n bits and produces a tweak value with 2n bits. The polyH$^{2n}$ function (522) produces an n-bit tweak value from the 2n-bit tweak value. The block cipher (523) encrypts the n-bit tweak value XOR'd with an n-bit input value (which varies between the first n-bit TBC $\tilde{F}'_{K'}$($X_1$) and second n-bit TBC $\tilde{F}'_{K'}$(the n-bit IV)). The output of the block cipher (523) is then XOR'd with the n-bit tweak value, to produce an n-bit output.

The VILTC $\tilde{V}$=TCTR[LRW2[polyH$^n$, E]]. For the TCTR procedure, $\mathcal{G}$ : $\{0,1\}^n \times \mathbb{N} \rightarrow \{0,1\}^n$, as $\mathcal{G}$ (T, i)=T. The key space for $\tilde{V}$ is $\{0,1\}^k \times \{0,1\}^n$, with key K being partitioned into keys for E and polyH$^n$. The tweak space for $\tilde{V}$ is $\{0,1\}^n$, and its domain is $\{0,1\}^{\{0,1, \ldots, (l-1)n\}}$.

As shown in FIG. 5a, the TCTR for VILTC $\tilde{V}$ is implemented as a series of components TBC $\tilde{F}_K$ (540). Each TBC $\tilde{F}_K$ (540) accepts, as tweak input, the n-bit IV (538). Each TBC $\tilde{F}_K$ (540) also accepts, as message input, a padded counter value $\langle i \rangle$, for $0 \le i \le v-2$. The output of each TBC $\tilde{F}_K$ (540) is XOR'd with an n-bit block $X_{i+2}$ of the message X to produce a block $Y_{i+2}$ of the variable-length output string Y.

FIG. 5c shows details of an n-bit TBC $\tilde{F}_K$ (540). The polyH$^n$ function (542) produces a resulting n-bit tweak value from an input n-bit tweak value. The block cipher (543) encrypts the resulting n-bit tweak value XOR'd with an n-bit input value (padded counter value). The output of the block cipher (543) is then XOR'd with the resulting n-bit tweak value, to produce an n-bit output.

C. Second Example Implementation $TCT_2$.

The second example implementation $TCT_2$ provides beyond birthday-bound security. For this implementation, the size of the N-bit TBC $\tilde{F}$ is $N=2n$. The 2n-bit TBC $\tilde{F}$ uses a variation of CDMS component, which includes several n-bit TBCs as part of CLRW2 components to provide beyond-birthday-bound security. The tweak space is extended using NH, with range of NH set to $\{0,1\}^{2n}$. Ultimately, setting $\tilde{F}$=CDMS[CLRW2]$^{NH}$ is secure against up to around $2^{2n/3}$ queries. The CLRW2 component also is used in a beyond birthday-bound secure VILTC component, namely $\tilde{V}$=TCTR[CLRW2[E, H]], at least for $l=o(q^{1/4})$. $TCT_2$ supports τn-bit tweaks and has domain $\{0,1\}^{\{2n,2n+1, \ldots, ln\}}$.

Figure 6B:
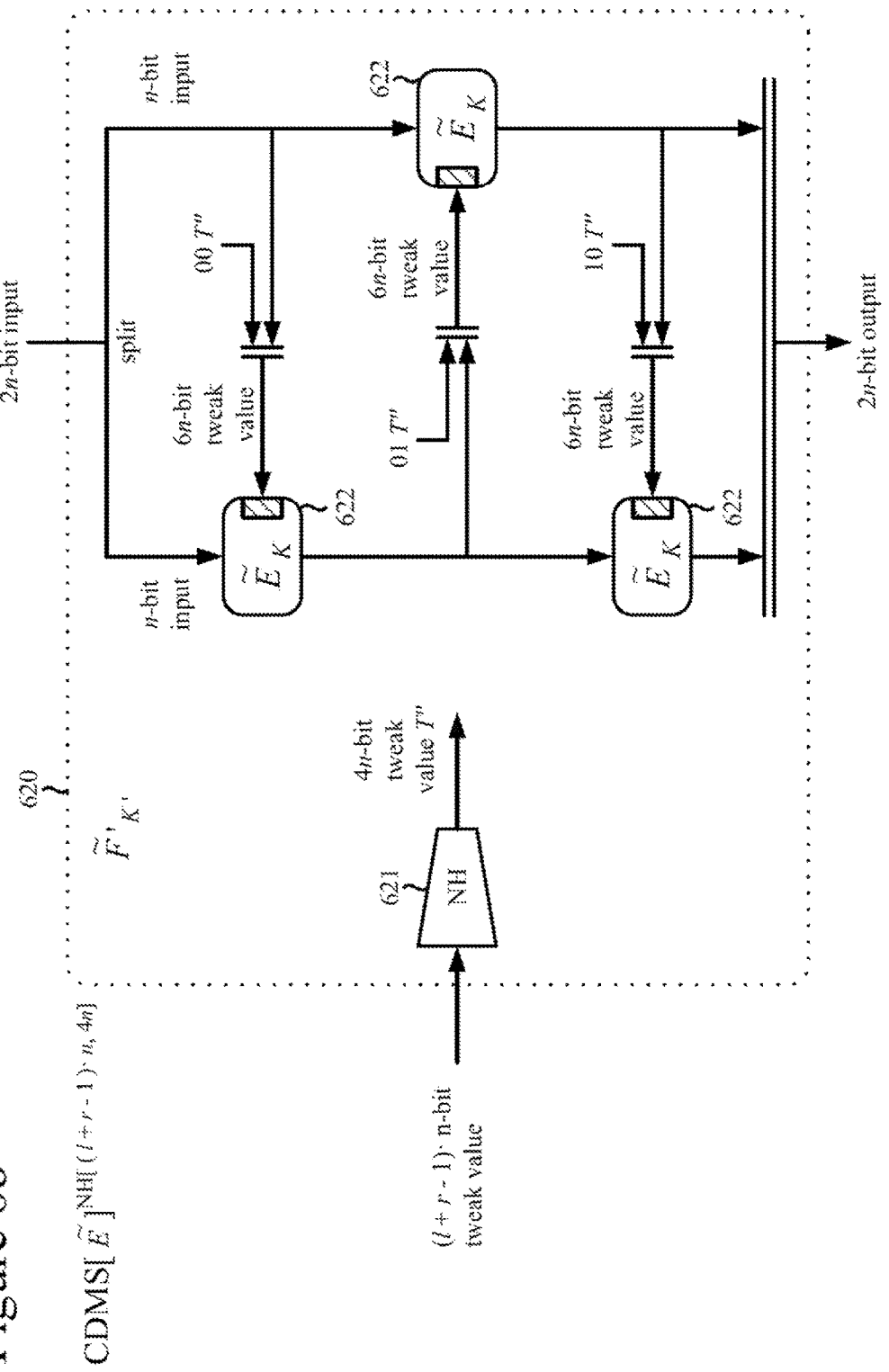
Figure 6C:
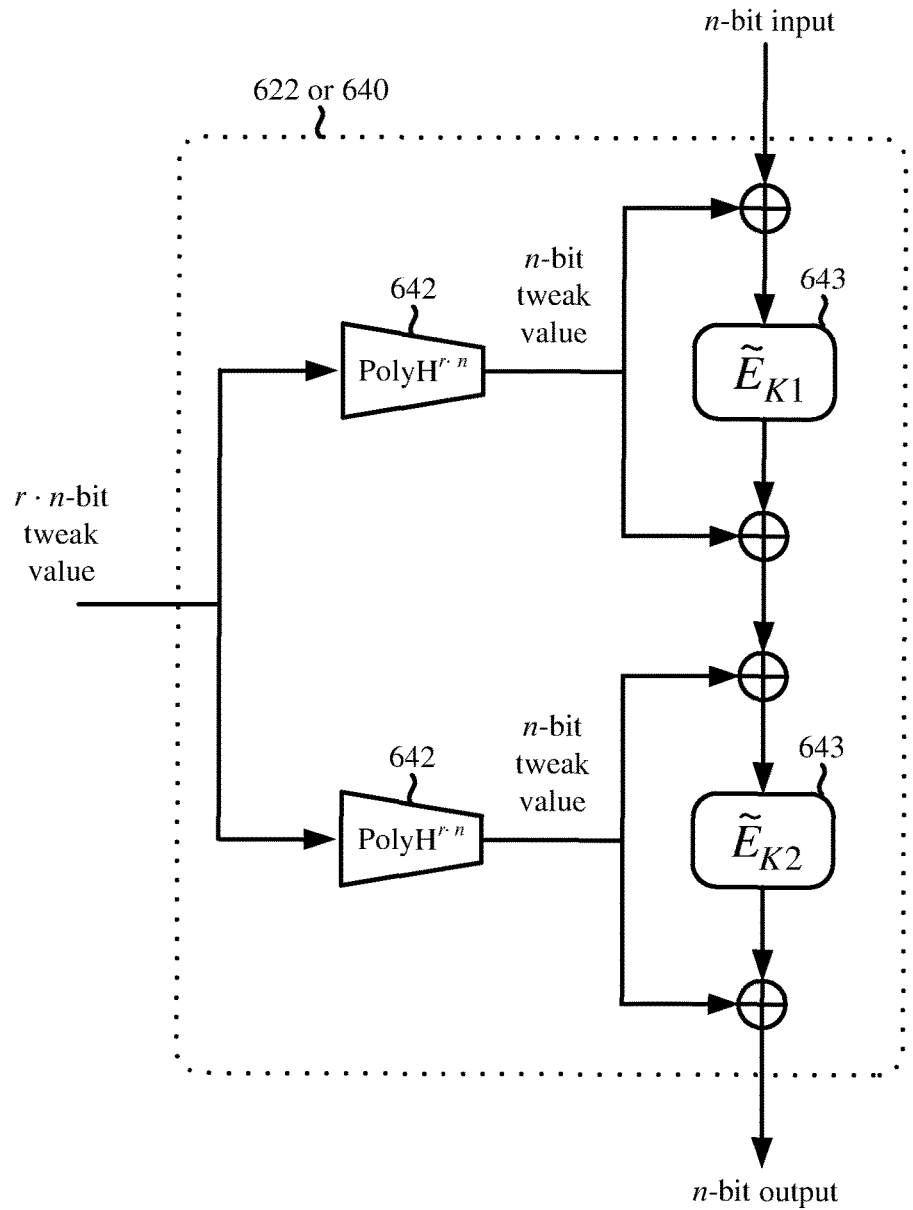

FIGS. 6a-6c illustrate components of the second example implementation $TCT_2$ (600), which takes a tweak T and message X as inputs. The message X is split into blocks $X_1$, $X_2$, . . . , $X_v$, where the length of the all blocks except the last block $X_v$ is n, and the length of the last block $X_v$ is less than or equal to n. The length of the message X is between 2n and l n bits. $TCT_2$ produces an output string $Y=Y_1, Y_2, \ldots, Y_v$. The block size of the FIL components is $N=2n$. For k, l, n, τ>0, E: $\{0,1\}^k \times \{0,1\}^n \rightarrow \{0,1\}^n$ is a block cipher. $TCT_2$=PIV[$\tilde{F}$, $\tilde{V}$], where the 2n-bit TBC $\tilde{F}$ and VILTC $\tilde{V}$ are set as follows.

The n-bit TBC $\tilde{F}$=CDMS[CLRW2[polyH$^{6n}$, E]]$^{NH[(l+\tau-1)n,4n]}$. That is, the 2n-bit TBC $\tilde{F}$ is a CDMS [CLRW2[polyH$^{6n}$, E]] component with its tweak space extended using NH. The key space for $\tilde{F}$ is $\{0,1\}^{2k} \times \{0,1\}^{12n} \times \{0,1\}^{(l+\tau-1)n}$, with key k' being partitioned into two keys for E, two keys for polyH$^{6n}$, and a key for NH[ln, 4n]. The tweak space for $\tilde{F}$ is $\{0,1\}^{\tau n}$.

FIG. 6a shows a first 2n-bit TBC $\tilde{F}'_{K'}$ (620) that accepts a tweak input (610) and message input. The message input is the first two n-bit blocks $X_1$ and $X_2$. The tweak input (610) is a tweak value T concatenated with a padded version of the remaining blocks of the message X. The first 2n-bit TBC $\tilde{F}'_{K'}$ (620) produces a 2n-bit IV (638).

FIG. 6a also shows a second n-bit TBC $\tilde{F}'_{K'}$ (620) that accepts a tweak input (660) and message input. The message input is the 2n-bit IV (638). The tweak input (660) is the tweak value T concatenated with a padded version of blocks $Y_3 \ldots Y_v$ of the variable-length output string Y. The second 2n-bit TBC $\tilde{F}'_{K'}$ (520) produces the first two blocks $Y_1$ and $Y_2$ of the variable-length output string Y.

FIG. 6b shows details of a 2n-bit TBC $\tilde{F}'_{K'}$ (620). The NH function (621) accepts a tweak value with (l+r–1)×n bits and produces a tweak value T' with 4n bits. The 2n-bit input, which varies between the first 2n-bit TBC $\tilde{F}'_{K'}$ ($X_1$ and $X_2$) and second 2n-bit TBC $\tilde{F}'_{K'}$(the 2n-bit IV), is split into two n-bit inputs. The first n-bit input is provided to a first CLRW2[polyH$^{6n}$, $\tilde{E}_K$] component (622), which also accepts a 6n-bit tweak value. The 6n-bit tweak value is determined by concatenating a padded version of the 4n-bit tweak value T' (padded with n zero bits out to a length of 5n bits) and the second n-bit input. The first CLRW2[polyH$^{6n}$, $\tilde{E}_K$] component (622) produces an n-bit output value, which is concatenated after a padded version of the 4n-bit tweak value T' (padded with n zero bits out to a length of 5n bits) to form a 6n-bit tweak value for the second CLRW2[polyH$^{6n}$, $\tilde{E}_K$] component (622). The second CLRW2[polyH$^{6n}$, $\tilde{E}_K$] component (622), which also accepts the second n-bit input, produces an n-bit output. Similarly, a third CLRW2 [polyH$^{6n}$, $\tilde{E}_K$] component (622) processes the n-bit output value from the first CLRW2 component (622) and a 6n-bit tweak value (formed as shown in FIG. 6b), producing another n-bit output. The n-bit outputs from the second and third CLRW2 components (622) are concatenated into a 2n-bit output of the CDMS component (620).

FIG. 6c shows details of CLRW2[polyH$'''$, $\tilde{E}_K$] component, where r can be 6 (as in the components (622) of FIG. 6b) or 2 (as in the components (640) of FIG. 6a). The first polyH$'''$ function (642) produces an n-bit tweak value from an input r·n-bit tweak value. The first block cipher (643) (with key K1) encrypts the n-bit tweak value XOR'd with an n-bit input value. The output of the first block cipher (643) is then XOR'd with the n-bit tweak value, to produce an n-bit intermediate value. The second polyH$'''$ function (642) produces an n-bit tweak value from the input r·n-bit tweak value. The second block cipher (643) (with key K2) encrypts the n-bit tweak value XOR'd with the n-bit intermediate value. The output of the second block cipher (643) is then XOR'd with the n-bit tweak value, to produce an n-bit output value.

The VILTC $\tilde{V}$=TCTR [CLRW2[polyH$^{2n}$,E]]. For the TCTR function, $\mathcal{G} : \{0,1\}^n \times \mathbb{N} \to \{0,1\}^n$, as $\mathcal{G}$ (T, i)=T. The key space for $\tilde{V}$ is $\{0,1\}^{2k} \times \{0,1\}^{4n}$, with key K being partitioned into two keys for E and two keys for polyH$^{2n}$. The tweak space for $\tilde{V}$ is $\{0,1\}^{2n}$, and its domain is $\{0,1\}^{\{0,1,2,\ldots,(l-2)n\}}$. TCT$_2$ uses 4k+(l+r+15)n bits of key material.

As shown in FIG. 6a, the TCTR for VILTC $\tilde{V}$ is implemented as a series of components TBC $\tilde{F}_K$ (640). Each TBC $\tilde{F}_K$ (640) is implemented as CLRW2[polyH$^{2n}$, $\tilde{E}_K$] component. Each TBC $\tilde{F}_K$ (640) accepts, as tweak input, the 2n-bit IV (638). Each TBC $\tilde{F}_K$ (640) also accepts, as message input, an n-bit padded counter value $\langle i \rangle$, for 0≤i≤v-3. The n-bit output of each TBC $\tilde{F}_K$ (640) is XOR'd with an n-bit block $X_{i+3}$ of the message X to produce a block $Y_{i+3}$ of the variable-length output string Y. FIG. 6c details a CLRW2 [polyH$'''$, $\tilde{E}_K$] component for TBC $\tilde{F}_K$ (640), where r=2.

D. Variations and Practical Considerations.

This section describes several variations of TCT$_1$ and TCT$_2$. None of these changes significantly impact the security bounds for these implementations, unless otherwise noted.

Reducing the number of block cipher keys. In the case of TCT$_1$, a single key can be used for both LRW2 instances, provided that domain separation is enforced through the tweak. This allows use of a single key for the underlying block cipher, which in some situations may allow for significant implementation benefits (for example, by allowing a single AES pipeline). One method that accomplishes this is to replace LRW2[polyH$^{2n}$, E]$^{NH[(l+1)n,2n]}$ with LRW2 [polyH$^{3n}$, E]$^{f(\epsilon,\cdot)}$ and LRW2[polyH$''$, E] with LRW2 [polyH$^{3n}$, E]$^{f(\cdot,\epsilon)}$. Here, $f$ is a $2^{-n}$-AU function with key space $\{0,1\}^{3n} \times 0,1^{ln}$, taking inputs of the form (X, $\epsilon$) (for some X ∈ $\{0,1\}^n$) or ($\epsilon$, Y) (for some Y ∈ $\{0,1\}^{\{0,1,\ldots,ln\}}$), and outputting a 3n-bit string. Let $f_L$(X, $\epsilon$)=$0^{2n}$||X and $f_L$($\epsilon$, Y)=$1^n$||NH[(l+1)n, 2n]$_L$(Y). The function $f$ described here is a mathematical convenience to unify the signatures of the two LRW2 instances, thereby bringing tweak-based domain separation into scope; in practice, the two instances can be implemented independently, save for a shared block cipher key. TCT$_2$ can be modified in a similar manner to require only two block cipher keys.

Performance improvements. For a FIL TBC, NH[ln, 2n] can be used in place of NH[(l+1)n, 2n] by adjusting the padding scheme appropriately. Also, in the TCTR portion for the second example implementation TCT$_2$, the polyH functions can be computed once per CLRW2 component, since each LRW2 invocation uses the same tweak.

One possible implementation of TCT$_2$ uses 72 finite field multiplications during the two FIL phases (a result of evaluating polyH$^{6n}$ twelve times). Alternatively, an implementation can cache an intermediate value of the polyH$^{6n}$ hash used inside of CDMS (four n-bit tweak blocks are constant per invocation), which saves 32 finite field multiplications. Pre-computing the terms of the polynomial hash corresponding to the domain-separation constants eliminates 12 more multiplications, leaving 28 in total. Four more are used during the VIL phase, giving a count of 32.

Handling large message spaces. Both TCT$_1$ and TCT$_2$ are designed with FDE applications in mind. In particular, they use a value l that is fixed ahead of time, and use more than ln bits of key material. These limitations are a consequence of using the NH hash function. A simple extension to NH, however, accommodates arbitrarily long strings. For a positive integer r, NH*$_L$(M$_1$M$_2$ . . . M$_v$)=NH$_L$(M$_1$)||NH$_L$(M$_2$)|| . . . ||NH$_L$(M$_v$)||$\langle$|M|mod rn$\rangle$, where |M$_i$|=rn for i<v, |M|≤rn and NH$_L$ abbreviates NH$_L$[rn, 2N]. Thus defined, NH* is $2^{-N}$-almost universal, has domain $\{0,1\}^*$, and requires rn bits of key material. This modification shifts some of the weight to the polyH hash. Eight extra finite field multiplications are used for each additional rn bits of input.

With these modifications, the final two terms in TCT$_1$'s security bound (see section 7) become $8q^2/2^n + 600q^2l^2/r^2 2^n + 4q^2(l-1)^2/2^n$, where ln is now the length of the adversary's longest query, l>2.5r, and the remaining terms measure the (S)PRP security of the underlying block cipher. Assuming $2^n$≥rn, |M| mod rn can be encoded within a single n-bit block. Although the constant of 600 is large, setting r=16, for example, reduces it to a more comfortable size—in this case to less than three. The bound for TCT$_2$ changes in a similar manner. (Also, if $2^{n-2}$≥rn, a single n-bit block can be used for both the tweak domain-separation constants and $\langle$|M|mod rn$\rangle$.)

Beyond birthday-bound security for long messages. When l is not bounded to some small or moderate value, TCT$_2$ no longer provides beyond-birthday-bound security. The problematic term in the security bound is $q(l-1)^2/2^n$. To address this, a different per-block tweak function can be used in the TCTR procedure. In particular $\mathcal{G}$ (T, i)=T||$\langle$ i $\rangle$. In the nonce-respecting case, the underlying TBC $\tilde{E}$ is then re-tweaked with a never-before-seen value on each message block. If $\tilde{E}$ were to be replaced by an ideal cipher Π, in the nonce-respecting case, every block of plaintext would be masked by the output of a fresh random permutation. In other words, every block returned will be uniformly random. Thus, a tight bound is expected in this case. Alternatively, one could use $Z_i \leftarrow 0^n$, and the same would be true.

E. Instantiating VILTCs with Protected IV Using Conventional Encryption.

Alternatively, the VILTC $\tilde{V}$ can be realized directly using conventional block cipher-based encryption. Consider the following implementations of $\tilde{V}$ and $\tilde{V}^{-1}$.

procedure $\tilde{V}_K(T, X)$:

$X_1, X_2, \ldots, X_b \xleftarrow{n} X$ for $i = 1$ to $b$

-continued $Y_i \leftarrow E_K(\langle T+i \rangle) \oplus X_i$

Return $Y_1, Y_2, \ldots, Y_b$ procedure $\tilde{V}_K^{-1}(T, Y)$:

$Y_1, Y_2, \ldots, Y_b \xleftarrow{n} Y$ for $i = 1$ to $b$ $X_i \leftarrow Y_i \oplus E_K(\langle T+i \rangle)$ Return $X_1, \ldots, X_b$ procedure $\tilde{G}_K(T, X)$:

$X_1, X_2, \ldots, X_b \xleftarrow{n} X$ $\overline{K} \leftarrow f_K(T)$ for $i = 1$ to $b$ $Y_i \leftarrow E_{\overline{K}}(\langle T+i \rangle) \oplus X_i$ Return $Y_1, Y_2, \ldots, Y_b$ procedure $\tilde{G}_K^{-1}(T, Y)$:

$Y_1, Y_2, \ldots, Y_b \xleftarrow{n} Y$ $\overline{K} \leftarrow f_K(T)$ for $i = 1$ to $b$ $X_i \leftarrow Y_i \oplus E_{\overline{K}}(\langle T+i \rangle)$ Return $X_1, \ldots, X_b$ This implementation of the VILTC $\tilde{V}$ uses counter-mode encryption, but with the initial value T surfaced as an input to make it a tweakable cipher. Unfortunately, this implementation of the VILTC $\tilde{V}$ lacks SRND-security against nonce-respecting adversaries. Nonetheless it can be modified as follows with security $$Adv_{\tilde{E}}^{smb}(A) = Pr\left[K \xleftarrow{\$} \mathcal{K}: A^{\tilde{E}_K(\cdot)} \Rightarrow 1\right] - Pr[A^{\$(\cdot),\$(\cdot)} \Rightarrow 1].$$

Given $\tilde{E}$ with tweak space $\mathcal{T}$ and message space $\mathcal{X}$, the oracle $\mathbb{E}_K$ takes a query $X \in \mathcal{X}$ and: (1) samples $$T \xleftarrow{\$} \mathcal{T},$$

(2) returns $E_K(T, X)$. Oracle $\mathbb{E}_K^{-1}$ behaves likewise on input $Y \in \mathcal{X}$, sampling $$T \xleftarrow{\$} \mathcal{T}$$

and returning $E_K^{-1}(T, Y)$.

VI. Authenticated Encryption/Decryption with Associated Data Using VILTCs.

Authenticated encryption with associated data ("AEAD") provides a way to authenticate messages that are sent with headers. For example, when a plaintext message is transformed into ciphertext in a way that protects its privacy and authenticity, there may be a packer header or other auxiliary information that accompanies the message and should be authenticated with the message. If a message is augmented with a nonce and redundancy, one can obtain authenticated encryption by passing the encoded message directly through an SPRP-secure block cipher with a sufficiently large domain.

This section describes ways to implement AEAD using VILTC components. The VILTC components can include VILTC components with protected IVs or VILTC components without protected IVs. In particular, this section identifies the salient properties of the mapping from header-message pairs (H, M) to tweakable cipher inputs (T, X). In addition to its simplicity, there are several practical advantages of implementing AEAD with VILTCs.

Authenticated encryption with VILTCs admits associated data and can withstand nonce-misuse. The tweak can be used effectively to bind a message header to the ciphertext.

Additionally, one can explore the effects of randomness, state or redundancy present in the message and the header inputs. For example, randomness and state can be shifted to the header without loss of security, potentially reducing the number of bits that must be processed cryptographically. In particular, this can reduce bandwidth overhead by leveraging nonces, randomness and redundancy already present in plaintext inputs. Messages in protocols that include sequence numbers, human-readable fields, or padding often contain useful nonces and redundancy.

AEAD with VILTCs also allows for multiple decryption error messages, while remaining robust against side-channel attacks that seek to exploit them (e.g., padding oracles). Use of multiple descriptive error messages can be quite useful in practice, but has often empowered damaging attacks. These attacks fail against AEAD schemes with VILTCs because, loosely, changing any bit of a ciphertext will randomize every bit of the decrypted plaintext string. Thus, AEAD with VILTCs offers robustness even in the face of certain side channels and common implementation mistakes. Descriptive error messages (e.g., bad_padding or bad_seq_number) cannot be leveraged to forge useful future ciphertext. Further, nonce repetitions only leak equality of plaintext.

This AEAD approach also works for FPE. To transparently insert an encryption layer into legacy systems (e.g., to database schemas or protocol specifications) with minimal changes, FPE uses ciphertext that has the same format as plaintext. For example, both might be restricted to the set $\Sigma^n$, for some (often non-binary) alphabet $\Sigma$. This precludes inserting dedicated IVs into ciphertext. One can compensate by using associated data to tweak encryption, making tweakable ciphers and their security definitions a natural fit. Unique associated data guarantees privacy in a more standard sense, and checking redundancies (such as credit card issuer Identification Numbers and checksums) provides authenticated encryption.

In general, given a header H and a message M, an AEAD scheme with a VILTC encodes (H, M) into a tweakable cipher input (T, X). For a Nonce of some fixed length, suppose T=Nonce∥H, and X=Nonce∥M. The header H is transmitted. The ciphertext cannot simply be $C=\tilde{E}_K(T, X)$, however, because the Nonce value is also needed for decryption. So, the ciphertext should be (Nonce, C). In this example, T=Nonce∥H was an encoded header, and X=Nonce∥M was an encoded message. The symbols T and X are replaced with $\overline{H}$ and $\overline{M}$, respectively. The mapping from H to $\overline{H}$=Nonce∥H is non-deterministic, but can be completely reproduced provided one knows Nonce, which acts as reconstruction information. The message encoding function uses the reconstruction information, and therefore has a different signature than the header encoding function. Also, the reconstruction information should not depend on M. The recipient computes $\overline{M} = \tilde{E}_K^{-1}(\overline{H}, C)$, and verifies that Nonce is a prefix of M in $\overline{M}$=Nonce∥M.

More formally, an AEAD scheme is a tuple $\Psi = (\mathcal{K}, \epsilon, \mathcal{D})$ consisting of a key-generation algorithm $\mathcal{K}$, an encryption algorithm $\epsilon$, and a decryption algorithm $\mathcal{D}$. For simplicity, the key-generation algorithm $\mathcal{K}$ is assumed to sample a key from a non-empty set of the same name. The encryption algorithm, which may be randomized or stateful, is a mapping $\epsilon: \mathcal{K} \times \mathcal{H} \times \mathcal{M} \to \mathcal{R} \times \{0,1\}^*$. Thus, encryption takes a key $K \in \mathcal{K}$, a header $H \in \mathcal{H} \subseteq \{0,1\}^*$, and a message $M \in \mathcal{M} \subseteq \{0,1\}^*$, and returns some reconstruction information $R \in \mathcal{R}$, along with ciphertext C.

$$(R, C) \xleftarrow{\$} \epsilon_K(H, M)$$

represents running $\epsilon_K$ on (H, M), which returns (R, C). The deterministic decryption algorithm is a mapping $\mathcal{D}: \mathcal{K} \times \mathcal{H} \times \mathcal{R} \times \{0,1\}^* \to \mathcal{M} \cup \text{Errors}$, where Errors is a set such that $\mathcal{M} \cap \text{Errors} = \emptyset$. (|Errors| need not equal 1.) For proper operation, $\Pr[\mathcal{D}_K(H, \epsilon_K(H, M)) = M] = 1$ for all $K \in \mathcal{K}$, $H \in \mathcal{H}$ and $M \in \mathcal{M}$. If $\epsilon$ is stateful, this holds for all states.

In practice, the header H is typically transmitted in the clear along with the ciphertext (e.g., when the header is needed for routing), but AEAD schemes with VILTCs may also encode H into some related $\overline{H}$ for internal use. If this encoding is non-deterministic, the reconstruction information R delivers whatever is used by decryption to properly reconstruct this $\overline{H}$ from H. For example, R may consist of a counter, some random bits, or some redundancy. It may also be the empty string.

To avoid constructions that are trivially insecure by virtue of writing message or key bits into R, the following conditions apply. Given any sequence of inputs $\{(H_i, M_i)\}_{1 \leq i \leq q}$ and any two sequences of possible outcomes $\{(R_i, C_i)\}_{i \leq q}$ and $\{(R'_i, C'_i)\}_{i \leq q}$, then for any $H \in \mathcal{H}, M, M' \in \mathcal{M}, K, K' \in \mathcal{K},$ and $r \in \mathcal{R},$ $\Pr[R = r \top \epsilon_K(H_i, M_i) = (R_i, C_i)$ for $i \leq q] =$ $\Pr[R' = r \mid \epsilon_{K'}(H'_i, M'_i) = (R'_i, C'_i)$ for $i \leq q],$ where $(R, C) \xleftarrow{\$} \epsilon_K(H, M)$ and $(R', C') \xleftarrow{\$} \epsilon_K(H, M'),$ the states of $\epsilon_K$ and $\epsilon_{K'}$ being conditioned on the two transcripts, respectively. That is, R (hence, R') can depend only on H, q, and coins tossed by $\epsilon_K$ on the query that generates R.

By allowing |Errors|>1, an AEAD scheme can return multiple, distinct error messages. This can be useful in practice, for example, for diagnostics within a protocol session.

Ideally, ciphertext is indistinguishable from random bits. Reconstruction information might not be random (e.g., R might be a counter), however, so the usual IND$-CPA notion is modified. To be specific, the privacy of an AEAD scheme $\Psi$ is measured via the following advantage:

$$Adv_\Psi^{priv}(A) = \Pr\left[K \xleftarrow{\$} \mathcal{K}; A^{\epsilon_K(\cdot, \cdot)} \Rightarrow 1\right] - \Pr\left[K \xleftarrow{\$} \mathcal{K}; A^{\$_K(\cdot, \cdot)} \Rightarrow 1\right].$$

$\$_K(\cdot, \cdot)$ is an oracle that, on input (H, M), computes $$(R, C) \xleftarrow{\$} \epsilon_K(H, C),$$

samples $$Y \xleftarrow{\$} \{0, 1\}^{|C|},$$

and returns (R, Y). The authenticity goal is the integrity of ciphertext. Namely, $$Adv_\Psi^{int-ctxt}(A) = \Pr\left[K \xleftarrow{\$} \mathcal{K}; A^{\epsilon_K(\cdot, \cdot), \mathcal{D}_K(\cdot, \cdot)} \text{Forges}\right],$$

where the Boolean event Forges is true if and only if A asks a query (H, R, C) to its $\mathcal{D}_K$ oracle such that (1) $\mathcal{D}_K(H, R, C) \notin$ Errors, and (2) no prior query to $\epsilon_K(\cdot, \cdot)$ returned (H, R, C). Without loss of generality, A halts as soon as Forges becomes true.

A. Encoding and Decoding Schemes.

Informally, an encoding algorithm reformats its input, and injects randomness, state or redundancy, while a decoding algorithm validates and distills out the original input data.

More formally, in example implementations, the AEAD scheme (and corresponding decryption) use a message space $\mathcal{M}$, a header space $\mathcal{H}$, an encoded message space $\overline{\mathcal{M}} \subseteq \{0,1\}^*$, and an encoded header $\overline{\mathcal{H}} \subseteq \{0,1\}^*$. These sets are non-empty, but could equal $\{\epsilon\}$. For a set Errors, Errors ∩ $\mathcal{M} = \emptyset$.

A header encoding function $\text{Encode}_H: \mathcal{H} \to \overline{\mathcal{H}}$ maps headers to encoded headers, possibly in some random or stateful fashion. There are a non-empty set $\mathcal{R}$ and a bijection $\langle \cdot, \cdot \rangle: \mathcal{R} \times \mathcal{H} \to \overline{\mathcal{H}}$ with the property that for all H, $\text{Encode}_H(H) = \langle R, H \rangle$ for some $R \in \mathcal{R}$. In other words, H can be recovered from $\text{Encode}_H(H)$, and any particular output of $\text{Encode}_H(H)$ can be reconstructed from H given the corresponding R. $\text{Encode}_H$ is $(\mathcal{H}, \mathcal{R}, \overline{\mathcal{H}})$-encoder (leaving $\langle \cdot, \cdot \rangle$ implicit).

A message encoding scheme EncodeMsg=$(\text{Encode}_M, \text{Decode}_M)$ consists of a message encoding function $\text{Encode}_M: \overline{\mathcal{H}} \times \mathcal{M} \to \overline{\mathcal{M}}$ and a message decoding function $\text{Decode}_M: \overline{\mathcal{H}} \times \overline{\mathcal{M}} \to \mathcal{M} \cup \text{Errors}$. $\text{Encode}_M$ can be randomized or stateful. $\text{Decode}_M(\overline{H}, \overline{M}) = M \in \mathcal{M}$ if and only if $\Pr[\text{Encode}_M(\overline{H}, M) = \overline{M}] > 0$ for some state of $\text{Encode}_M$; otherwise, $\text{Decode}_M(\overline{H}, \overline{M}) \in$ Errors. It is possible, for example, for $\text{Decode}_M(\overline{H}, \overline{M}) = (\bot, \overline{H}, \overline{M}) \in$ Errors). The $\text{Decode}_M$ algorithm is deterministic, and all algorithms should run in linear time. EncodeMsg is a $(\mathcal{H}, \mathcal{M}, \overline{\mathcal{H}}, \overline{\mathcal{M}}, \text{Errors})$-encoding scheme.

The encoding functions have an associated maximal stretch. This is defined to be the smallest $s \in \mathbb{N}$ such that, for all $H \in \mathcal{H}$, $\overline{H} \in \overline{\mathcal{H}}$, and $\overline{M} \in \overline{\mathcal{M}}$, $|\text{Encode}_H(H)| \leq |H| + s$ and $|\text{Encode}_M(\overline{H}, M)| \leq |M| + s$.

One key property of the encoding mechanisms relates to the likelihood that an encoding scheme can be made to repeat outputs. Let A be an adversary that asks q queries (not necessarily distinct) to an oracle $f$, receiving $Y_1, Y_2, \ldots, Y_q$ in response, and that halts by outputting these values. ($f$ can be a message- or header-encoding function.) A can be assumed to be deterministic. $\delta: \mathbb{N} \to [0,1]$ is a function. $f$ is $(d, \delta)$-colliding if $\Pr[A^f \Rightarrow (Y_1, Y_2, \ldots, Y_q): \exists i_1 < i_2 < \ldots < i_d$ such that $Y_{i_1} = Y_{i_2} = \ldots = Y_{i_d}] \leq \delta(q)$. This notion is only defined for $d \geq 2$. Given a $(d, \delta)$-colliding oracle, it can be assumed that $\delta(0) = \delta(1) = 0$.

A second key property captures the probability that a random string (of a given length) is a valid encoding. In essence, this is a measure of the density of encodings. $\in \in \mathbb{R}$ is a real number. The $(\mathcal{H}, \mathcal{M}, \overline{\mathcal{H}}, \overline{\mathcal{M}}, \text{Errors})$-encoding scheme EncodeMsg=(Encode$_M$, Decode$_M$) is $\in$-sparse if for all positive integers n and all $H \in \overline{\mathcal{H}}$, $|\{C \in \{0,1\}^n : \text{Decode}(H, C) \notin \text{Errors}\}|/2^n \le \in$.

B. AEAD Via Encode-Then-Encipher, Corresponding Decipher-Then-Decode.

FIG. 7 shows a generalized technique (700) for authenticated encryption with associated data using a VILTC. An encryption system performs the technique (700).

The encryption system receives (710) a header and a message. The encryption system processes (720) the message using a VILTC to provide authenticated encryption with associated data. The VILTC uses a protected IV. Alternatively, the VILTC is a conventional VILTC. A tweak for the VILTC is based at least in part on the header. The processing produces an encrypted message. The encryption system outputs (730) the header and the encrypted message.

For example, as part of the processing (720) of the message, the encryption system determines a modified header using the header and reconstruction information, then determines a modified message using the message and the modified header. The encryption system encrypts the modified message using the VILTC, with the modified header providing the tweak for the VILTC. The encryption system outputs (730) the reconstruction information along with the header and encrypted message.

The encryption system can repeat the technique (700) for one or more other messages.

FIG. 8 shows a generalized technique (800) for authenticated decryption with associated data using a VILTC. A decryption system performs the technique (800).

The decryption system receives (810) a header and an encrypted message. The decryption system processes (820) the encrypted message using a VILTC to provide authenticated decryption with associated data. The VILTC uses a protected IV. Alternatively, the VILTC is a conventional VILTC. A tweak for the VILTC is based at least in part on the header. The processing produces a decrypts message, which the decryption system outputs (830).

The decryption system can also receive reconstruction information. As part of the processing (820) of the encrypted message, for example, the decryption system determines a modified header using the header and the reconstruction information, then decrypts the encrypted message using the VILTC, with the modified header providing the tweak for the VILTC, thereby producing a modified message. The decryption system determines the message using the modified message and the modified header.

Optionally, for an authentication step, the decryption system checks to see if the message is valid. For example, if a pre-determined number of "0" bits have been appended to a message during encryption, then decryption can check for the presence of those bits. If this check fails, then decryption outputs an error. There may be multiple different checks for a message to pass, and the output error(s) may vary depending on which (combination of) checks fail. (This is the "authenticated" part of "authenticated encryption"—if an attacker tampers with an encrypted message, it will likely no longer be valid once decrypted.)

The decryption system can repeat the technique (800) for one or more other messages.

More formally, in example implementations, $\tilde{E}: \mathcal{K} \times \overline{\mathcal{H}} \times \overline{\mathcal{M}} \to \overline{\mathcal{M}}$ is a tweakable cipher. Encode$_H$ is a $(\mathcal{H}, \mathcal{R}, \overline{\mathcal{H}})$-encoder, and EncodeMsg=(Encode$_M$, Decode$_M$) is an $(\mathcal{H}, \mathcal{M}, \overline{\mathcal{H}}, \overline{\mathcal{M}}, \text{Errors})$-encoding scheme, for some non-empty sets $\mathcal{H}$, $\mathcal{M}$, and $\mathcal{R}$. From these, an encode-then-encipher AEAD scheme $\Psi[\text{Encode}_H, \text{EncodeMsg}, E]$ is defined as follows.

procedure $\varepsilon_K(H, M)$:

$\overline{H} \leftarrow \langle R, H \rangle \xleftarrow{\$} \text{Encode}_H(H)$ $\overline{M} \xleftarrow{\$} \text{Encode}_M(\overline{H}, M)$ Return $R, \tilde{E}_K(\overline{H}, \overline{M})$ procedure $\mathcal{D}_K(H, R, C)$:

$\overline{H} \leftarrow \langle R, H \rangle$ $\overline{M} \leftarrow \tilde{E}_K^{-1}(\overline{H}, C)$ Return Decode$_M(\overline{H}, \overline{M})$ Reconstruction information R allows decryption to reconstruct $\overline{H}$ from the header (in lieu of sending $\overline{H}$ as part of the ciphertext, or forcing the calling application to replace H with $\overline{H}$.)

As a simple example, Encode$_H$ prepends an 64-bit counter R to the header H, and Encode$_M(\overline{H}, M)$ returns $M \| 0^{80}$. Then Encode$_H$ is (2,0)-colliding, and Encode$_M$ is $2^{-80}$-sparse (but (2,1)-colliding). Authenticity checks implicitly take place inside the Decode$_M$ function.

VII. Explanation of Results.

This section provides a detailed justification for the results presented above.

Theorem 1—Security for VILTC with Protected IV. A VILTC with a protected IV still includes a VILTC module within it. The VILTC with a protected IV has a larger domain, and the N-bit TBC provide advantages in terms of security.

For tweak spaces and message spaces $(\mathcal{T}, \mathcal{Y}, \mathcal{T}, \mathcal{X})$ as defined in section IV, and for TBC length N, $\tilde{F}: \mathcal{K}' \times \mathcal{T} \times \{0,1\}^N \to \{0,1\}^N$ is a tweakable block cipher, and $\tilde{V}: \mathcal{K} \times \{0,1\}^N \times \mathcal{Y} \to \mathcal{Y}$ is a VILTC. PIV[$\tilde{F}, \tilde{V}$]: $(\mathcal{K}' \times \mathcal{K}) \times \mathcal{T} \times \mathcal{X} \to \mathcal{X}$. A is an adversary making $q < 2^N/4$ queries totaling $\mu$ bits and running in time t. For adversaries B and C, making q and 2q queries, respectively, and both running in O(t) time, $$Adv_{PIV[\tilde{F}\tilde{V}]}^{srp}(A) \le Adv_{\tilde{V}}^{srnd}(B) + Adv_{\tilde{F}}^{stprp}(C) + \frac{4q^2}{2^N},$$

where B is nonce-respecting and whose queries total $\mu$–qN bits in length.

The VIL portion $\tilde{V}$ of the PIV composition needs to be SRND-secure against only nonce-respecting adversaries. It is easy to build efficient schemes meeting this requirement. Only the fixed-input length ("FIL") portion $\tilde{F}$ needs to be secure against STPRP adversaries that can use arbitrary querying strategies. Thus the PIV composition promotes nonce-respecting security over a large domain into full STPRP security over a slightly larger domain. If $\tilde{F}$ is a good STPRP, then if any part of T or X is "fresh," the string for the IV should be random. Hence, it is unlikely that an IV value is repeated, and so nonce-respecting security of the VIL component is enough. The same holds when deciphering, if any part of T, Y is "fresh."

The term $4q^2/2^N$ accounts for collisions in IV and the difference between $\tilde{F}$ and a random function. This is a birthday-bound term in N, the block size of $\tilde{F}$. Since most TBC designs employ (one or more) underlying block ciphers, the block size N of $\tilde{F}$ can be larger than the block size n of some underlying block cipher upon which it might be built. Indeed, given an n-bit block cipher (and a hash function), $\tilde{F}$ can be built with N=2n.

If one removes the lower $\tilde{F}$ invocation (after $\tilde{V}$) and returns IV∥$Y_R$, the resulting composition does not generically deliver a secure STPRP. On the other hand, it is secure as a TPRP (just not a strong TPRP). For a message space $\{0,1\}^S (S \subseteq \bar{\mathbb{N}})$, a tweak space $\mathcal{T}$, and a non-negative integer n≤min(S), let A be an adversary making at most q queries and running in time t.

$$Adv_{PIV[\tilde{F},\tilde{n}]}^{tprp}(A) \leq Adv_{PIV[\tilde{F},\tilde{n}]}^{srnd}(A) + \frac{q(q-1)}{2^{min(S)+1}}.$$

This result is essentially a PRF-PRP switching lemma for TBCs, and reduces the problem to that of bounding $Adv_{PIV[\tilde{F},\tilde{V}]}^{\overline{srnd}}(A)$.

Consider $$\varepsilon[\tilde{V}] = PIV[\tilde{V}, \Pi], \text{ where } \Pi \xleftarrow{\$} BC(N)$$

is an ideal cipher. The oracles in Game 1 ("G1") (shown in FIG. 9) simulate $\varepsilon[\tilde{V}]$ and $\varepsilon[\tilde{V}]^{-1}$ using lazy sampling to define Π, so $Pr[A^{\varepsilon[\tilde{V}],\varepsilon[\tilde{V}]^{-1}} \Rightarrow 1] = Pr[G1(A) \Rightarrow 1]$. In FIG. 9, Game 1 includes the boxed statements.

In Game 2 ("G2") (also shown in FIG. 9), "illegal" values are no longer resampled when defining Π. In FIG. 9, Game 2 does not include the boxed statements. The only changes in the code occur after a Boolean "bad" flag is set to true; by the Fundamental Lemma of Game-Playing:

$$Adv_{\varepsilon[\tilde{V}]}^{\overline{srnd}}(A) \leq (Pr[G2(A) \Rightarrow 1] - Pr[A^{\$(\cdot,\cdot),\$(\cdot,\cdot)} \Rightarrow 1]) + Pr[G2(A); bad_1 \lor bad_2 \lor bad_3].$$

In Game 2, $\tilde{V}$ is never queried using the same tweak twice, and the oracles in the game return values with a random n-bit prefix. In Games 1 and 2, Boolean variables are initialized to false.

In a third Game ("G3") (not shown in FIG. 9), $\tilde{V}$ is replaced by an oracle $(\cdot,\cdot)$ that always returns a random string equal in length to its second input. By a standard argument there exists some nonce-respecting adversary B making q queries and running in $\mathcal{O}(t)$ time such that:

$$Pr[G2(A) \Rightarrow 1] - Pr[G3(A) \Rightarrow 1] \leq Adv_{\tilde{V}}^{\overline{srnd}}(B).$$

This leads to:

$$Adv_{\varepsilon[\tilde{V}]}^{\overline{srnd}}(A) \leq (Pr[G3(A) \Rightarrow 1] - Pr[A^{\$(\cdot,\cdot),\$(\cdot,\cdot)} \Rightarrow 1]) + Pr[G2(A); bad_1 \lor bad_2 \lor bad_3] + Adv_{\tilde{V}}^{\overline{srnd}}(B).$$

Each the first N bits of each oracle output (corresponding to $Z'_i$) are always uniformly random in Game 2. When $\tilde{V}$ switches to $(\cdot,\cdot)$ in Game 3, the remaining bits also become uniformly random. Hence $Pr[G3(A) \Rightarrow 1] = Pr[A^{\$(\cdot,\cdot),\$(\cdot,\cdot)} \Rightarrow 1]$.

The final task is to bound the probability that A sets a bad flag in Game 2. The probability that $bad_1$ is set during query j is less than $j/(2^N-2j)$. Similarly, the probabilities of $bad_2$ and $bad_3$ being set are at most $2j/(2^N-2j)$ and $2^j/2^N$, respectively. Therefore, the probability that at least one flag is set during query j is at most $3j/(2^N-2j)+2j/2^N$.

Taking the union bound over j ∈ 1,2, . . . , q yields Pr[G1(A);

$$bad_1 \lor bad_2 \lor bad_3] \leq q^2\left(\frac{1.5}{2^N-2q} + \frac{1}{2^N}\right).$$

Since $q<2^N/4$, $1.5/(2^N-2q)<3/2^N$. With the previous results, using a standard argument to return to the computational setting completes the proof:

$$Adv_{PIV[\tilde{F},\tilde{V}]}^{\widetilde{tprp}}(A) \leq Adv_{\tilde{V}}^{\overline{srnd}}(B) + Adv_{\tilde{F}}^{\widetilde{sprp}}(C) + \frac{4q^2}{2^N},$$

where C makes 2q queries, B makes q queries of total length μ−qN bits without repeating a tweak, and both run in $\mathcal{O}(t)$ time.

Theorem 2—TCTR. Consider the behavior of the procedure TCTR when $\mathcal{G}$ (T, i)=T. The TBC $\tilde{E}: \{0,1\}^k \times \mathcal{T} \times \{0,1\}^n \to \{0,1\}^n$, and TCTR[$\tilde{E}$]$_K$ and TCTR[$\tilde{E}$]$_K^{-1}$ are defined as in the TCTR pseudocode listings of section V, with $\mathcal{G}$ (T, i)=T ∈ $\mathcal{T}$. A is a nonce-respecting adversary that runs in time t and asks q queries, each of length at most ln bits (so, μ≤zln). Then, for some adversary B making at most ql queries and running in time $\mathcal{O}(t)$, $Adv_{TCTR[\tilde{E}]}^{\overline{srnd}}(A) \leq Adv_{\tilde{E}}^{\widetilde{prp}}(B) + 0.5ql^2/2^n$. The bound displays birthday-type behavior when $l=o(\sqrt{q})$, and is tightest when l is a small constant. An important application with small, constant l is full-disk encryption. Here plaintext X would typically be 4096 bytes long, so if the underlying TBC has block size n=128, there are roughly l=256 blocks.

Theorem 3—STPRP Security of $TCT_1$. For $TCT_1$ defined as in section V.B, A is an adversary making $q<2/4$ queries and running in time t. Adversaries B and C, both running in time $\mathcal{O}(t)$, make (l−1)q and 2q queries respectively, such that $$Adv_{TCT_1[\tilde{E}]}^{\widetilde{sprp}}(A) \leq Adv_E^{prp}(B) + Adv_{\tilde{E}}^{\widetilde{sprp}}(C) + \frac{32q^2}{2^n} + \frac{4q^2(\ell-1)^2}{2^n}.$$

It follows that:

$$Adv_{TCT_1[\tilde{E}]}^{\widetilde{sprp}}(A) \leq \frac{4q^2}{2^n} + Adv_{\tilde{V}}^{\overline{srnd}}(t', q) + Adv_{\tilde{F}}^{\widetilde{sprp}}(t', 2q) \leq$$

$$\frac{4q^2}{2^n} + \left[\frac{q(\ell-1)^2}{2^n} + Adv_{LRW2[polyH^n,E]}^{\widetilde{sprp}}(t', (\ell-1)q)\right] +$$

$$\left[\frac{24q^2}{2^n} + \frac{4q^2}{2^n} + Adv_{\tilde{E}}^{\widetilde{sprp}}(t', 2q)\right] \leq \frac{4q^2}{2^n} + \left[\frac{q(\ell-1)^2}{2^n} + \frac{3q^2(\ell-1)^2}{2^n} + Adv_E^{prp}((\ell-1)q, t')\right] + \left[\frac{28q^2}{2^n} + Adv_{\tilde{E}}^{\widetilde{sprp}}(t', 2q)\right] \leq \frac{32q^2}{2^n} +$$

$$\frac{q(\ell-1)^2}{2^n} + \frac{3q^2(\ell-1)^2}{2^n} + Adv_E^{prp}((\ell-1)q, t') + Adv_{\tilde{E}}^{\widetilde{sprp}}(t', 2q).$$

This algorithm requires 2k+(3+τ+l)n bits of key material, including two keys for $\tilde{E}$. A single key for E may suffice, however, with no significant damage to the security bound, although this improvement is motivated primarily by performance concerns. Thus, the $TCT_1$ implementation retains the security of previous constructions, and uses arithmetic in rings with powers-of-two moduli, rather than in a finite field. This may potentially improve performance in some architectures.

Theorem 4—STPRP Security of $TCT_2$. For $TCT_2$ defined as in section V.C, A is an adversary making q queries and running in time t, where $6q, lq<2^{2n}/4$. Adversaries B and C, both running in $\mathcal{O}(t)$ time, make $(l-1)q$ and $6q$ queries, respectively, such that $$\text{Adv}_{\text{TCT}_2}^{\text{sprp}}(A) \le 2Adv_E^{prp}(B) + 2Adv_E^{sprp}(C) +$$

$$\frac{12q^2}{2^{2n}} + \frac{q(\ell-1)^2}{2^n} + \frac{6\ell^3 q^3}{2^{2n-2} - \ell^3 q^3} + \frac{6^4 q^3}{2^{2n-2} - 6^3 q^3}.$$

It follows that:

$$\text{Adv}_{\text{TCT}_2}^{\text{sprp}}(A) \le \frac{4q^2}{2^{2n}} + \text{Adv}_{\tilde{V}}^{\text{strnd}}(t', q) + Adv_F^{sprp}(t', 2q) \le$$

$$\frac{4q^2}{2^{2n}} + \left[\frac{q(\ell-1)^2}{2^n} + \text{Adv}_{\text{CLRW2}}^{prp}[H^{2n}, E](t', (\ell-1)q_*)\right] +$$

$$\left[\frac{4q^2}{2^{2n}} + \frac{4q^2}{2^{2n}} + \text{Adv}_{\text{CLRW2}}^{\text{sprp}}[H^{6n}, E](t', 6q_*)\right] \le$$

$$\frac{12q^2}{2^{2n}} + \frac{q(\ell-1)^2}{2^n} + \frac{6\ell^3 q^3}{2^{2n-2} - \ell^3 q^3} + \frac{6^4 q^3}{2^{2n-2} - 6^3 q^3} +$$

$$2Adv_E^{prp}(t', (\ell-1)q) + 2Adv_E^{sprp}(t', 6q).$$

Some of the constants in this bound are significant. However, $TCT_2$ nevertheless provides substantially better security bounds than $TCT_1$ and previous constructions.

Theorem 5—Beyond Birthday-Bound Security for Long Messages. $\tilde{E}: \{0,1\}^k \times \mathcal{T} \times \{0,1\}^n \to \{0,1\}^n$ is a TBC, and $\text{TCTR}[\tilde{E}]_K$ and $\text{TCTR}[\tilde{E}]_K^{-1}$ are defined as in section V.D, with $g: \mathcal{T}' \times \mathbb{N} \to \mathcal{T}$ being an arbitrary infective mapping. A is a nonce-respecting adversary that runs in time t and asks q queries of total length at most $\mu=\sigma n$ bits. Some adversary B makes at most $\sigma$ queries and runs in time $\mathcal{O}(t)$, such that $\text{Adv}_{\text{TCTR}[\tilde{E}]}^{\text{srnd}}(A) \le \text{Adv}_{\tilde{E}}^{\text{stp}}(B)$. Using this variation of TCTR in the security proofs for $TCT_1$ and $TCT_2$ removes the $q(l-1)^2$ term from the bounds, thereby lifting message length concerns. If this change is made, $g(T, i)$ is computed up to l times per invocation, rather than just once. This problem may be mitigated by using another TBC (as described in Rogaway, "Efficient Instantiations of Tweakable Blockciphers and Refinements to Modes OCB and PMAC" (2004)) in place of LRW2, which makes incrementing the tweak extremely fast without significantly changing the security bound. When the above change are made, $TCT_1$ and $TCT_2$ offer efficient tweakable ciphers on an unbounded domain, losing security guarantees only after $\mathcal{O}(2^{n/2})$ (resp., $\mathcal{O}(2^{2n/3})$) bits have been enciphered.

Theorem 6 and Lemmas—VILTC with Protected IV with Conventional Encryption. Suppose $\mathcal{T}, \mathcal{Y}, \mathcal{T}, \mathcal{X}$, integer N, TBC $\tilde{F}$ and tweakable cipher $\tilde{V}$ are as described in Theorem 1. A is an adversary making $q<2^N/4$ queries and running in time t. Adversaries B and C, making q and 2q queries, respectively, run in $\mathcal{O}(t)$ time, such that $$\text{Adv}_{\tilde{V}[\tilde{F},\tilde{E}]}^{\text{sprp}}(A) \le \frac{5q^2}{2^N} + \text{Adv}_{\tilde{V}}^{\text{srnd}}(B) + \text{Adv}_{\tilde{F}}^{\text{sprp}}(C)$$

where B is nonce-respecting. A standard proof shows that the TBC in the pseudocode listings in section V.E is SRND$-secure, up to a birthday bound, if E is secure as a PRP.

Suppose $E: \{0,1\}^k \times \{0,1\}^n \to \{0,1\}^n$ is a block cipher, and $\tilde{V}$ and $\tilde{V}^{-1}$ are defined as in the pseudocode listings in section V.E. Let A be un adversary running in time t, and asking q queries these totaling at most $\mu=\sigma n$ bits. Then $\text{Adv}_{\tilde{V}}^{\text{srnd}}(A) \le \sigma^2/2^n + \text{Adv}_E^{prp}(B)$, where B asks at most $\sigma$ queries, and runs in time $\mathcal{O}(t)$.

Thus, one could compose counter-mode encryption with $\tilde{F}$ based on LRW2 to build an efficient, birthday-bound-secure STPRP. One can view $\tilde{F}_{K'}(T\|X[N+1 \ldots], X[1 \ldots N))$ as a special kind of PRF (one with invertibility properties), that takes input (T, X) and returns a "synthetic IV" for use in counter-mode. The second application of $\tilde{F}_{K'}$ then serves to hide this synthetic IV in way that leaves it recoverable to those in possession of key K'.

The security of this counter-mode construction can be increased by "re-keying'" the underlying block cipher, using a PRF $f: \{0,1\}^k \times (0,1)^n \to \{0,1\}^k$ to generate per-message keys, as shown in the construction of $\tilde{G}, \tilde{G}^{-1}$ in the pseudocode listings of section V.E. $\tilde{G}_K(T, X)$ can be computed as (1) $\overline{K} \leftarrow f_K(T)$, (2) return $\tilde{F}_{\overline{K}}(T, X)$. Recalling that, for any function $f: \mathcal{K} \times \mathcal{S} \to \mathcal{S}'$, the pseudo-random function (PRF) advantage of adversary A against $f$ is defined to be $$Adv_f^{prf}(A) = Pr\left[K \xleftarrow{\$} \mathcal{K}: A^{f_K(\cdot)} \Rightarrow 1\right] - Pr\left[\rho \xleftarrow{\$} Func(\mathcal{S}, \mathcal{S}'): A^{\rho(\cdot)} \Rightarrow 1\right],$$

theorem 6 follows.

Theorem 6. $E: \{0,1\}^k \times \{0,1\}^n \to \{0,1\}^n$ is a block cipher, and $\tilde{V}$ and $\tilde{V}^{-1}$ are as defined in the pseudocode listings of section V.E. $f: \{0,1\}^k \times \{0,1\}^n \to \{0,1\}^k$ is a function, and $\tilde{G}$ and $\tilde{G}^{-1}$ are as defined in the pseudocode listings of section V.E. A is a nonce-respecting adversary that runs in time t, and asks q queries, each of length at most mn bits (so, $\mu \le qmn$). $\text{Adv}_{\tilde{G}}^{\text{srnd}}(A) \le q(m^2/2^n + Adv_E^{prp}(B)) + Adv_f^{prf}(C)$ where: (1) B asks at most m queries and runs in time $\mathcal{O}(t)$, and (2) C asks q queries and runs in time at most $\mathcal{O}(t)$.

If the maximum number of blocks in a message m is small, this re-keying approach has the potential to give beyond birthday-bound SRND-security against nonce-respecting adversaries. In the case of FDE, for example, $Adv_E^{prp}(t', 32)$ appears to be very small when n=128, so security for $q \gg 2^{64}$ seems possible. This implementation uses a PRF $f$ that remains secure for any such q.

In any case, the construction of the VILTC $\tilde{G}$ violates a core principle of the tweakable primitive abstraction, namely that tweak changes should be fast, and much faster than changing the key.

Theorem 7—Privacy for AEAD. $\Psi = \Psi[\text{Encode}_H, \text{EncodeMsg}, \tilde{E}]$ as defined in the pseudocode listings in section VI.B. s is the maximal stretch of EncodeMsg, s' is the maximal stretch of $\text{Encode}_H$, and m is the length of the shortest $\overline{M} \in \bar{\mathcal{M}}$ satisfying $\text{Decode}_M(\overline{H}, \overline{M}) \ne$ Errors for some $\overline{H} \in \bar{\mathcal{H}}$. A is an adversary making q queries totaling $\mu$ bits, and running in time t. If $\text{Encode}_H$ is $(d, \delta_H)$-colliding and $\text{Encode}_M$ is $(2, \delta_M)$-colliding for some $\delta_M$ that is increasing and convex on $\{0, 1, \ldots, q\}$, there is an adversary B such that:

$$Adv_\Psi^{priv}(A) \le Adv_{\tilde{E}}^{\tilde{sprp}}(B) +$$

$$\left(\delta_M(d-1) + \frac{(d-1)(d-2)}{2^{m+1}}\right)\left\lceil\frac{q}{d-1}\right\rceil + \left(\delta_M(q) + \frac{q(q+1)}{2^{m+1}}\right)\delta_H(q),$$

where B makes q queries of total length at most $\mu+q(s+s')$ bits and runs in time $\mathcal{O}(t)$.

Theorem 8—Authenticity for AEAD. $\Psi[\tilde{E}] = \Psi[\text{Encode}_H, \text{EncodeMsg}, \tilde{E}]$ as defined in the pseudocode listings of section VI.B. Let s is the stretch of EncodeMsg, s' is the maximal stretch of $\text{Encode}_H$, and m is the length of the shortest $\overline{M} \in \overline{\mathcal{M}}$ satisfying $\text{Decode}_M(\overline{H}, \overline{M}) \ne$ Errors for some $\overline{H} \in \overline{\mathcal{H}}$. A is an adversary making $q_\epsilon$ (resp., $q_\mathcal{D}$) queries totaling $\mu_\epsilon$ (resp., $\mu_\mathcal{D}$) bits to its encryption (resp., decryption) oracle, and running in time t. If $\text{Encode}_M$ is $\in$-sparse and $q_\epsilon + q_\mathcal{D} < 2^{m-1}$, there is an adversary B such that $Adv_{\Psi[\tilde{E}]}^{int\text{-}ctxt}(A) \le Adv_{\tilde{E}}^{\tilde{sprp}}(B) + 2q_\mathcal{D} \in$, where B makes $q_\epsilon$ forward-queries of total length $(\mu_\epsilon + q_\epsilon s)$ bits, $q_\mathcal{D}$ inverse-queries of total length $(\mu_\mathcal{D} + q_\mathcal{D} s')$ bits, and runs in $\mathcal{O}(t)$ time.

Consider the case that $\text{Encode}_H$ is (2,0)-colliding. In this case, the privacy bound. (Theorem 7) simplifies to $Adv_\Psi^{priv}(A) \le Adv_{\tilde{E}}^{\tilde{sprp}}(B)$. This is intuitive, since if the tweak $\overline{H}$ never repeats, the outputs $\tilde{E}_K(\overline{H}, \overline{M})$ are uniformly random strings for any valid encoding of (H, M) into $\overline{M}$; $\text{Encode}_H(H, M) = \overline{M}$ suffices. Thus, good encodings of the header H can substantially reduce the burden placed upon encoding of (H, M) into $\overline{M}$.

More generally, assume that the probability of $\text{Encode}_H$ producing any $\overline{H}$ more than d times, for some small constant d<<q, is negligible. Then the final teim in the bound can effectively be ignored. The second term is roughly $q\delta_M(d) + q/2^{m+1}$. Now, notice that $\delta_M$ is evaluated at d, not q, and so $q\delta_M(d)$ can be made negligible by encoding a reasonable amount of randomness into $\overline{M}$ (e.g. log(q) bits). For some natural choices of EncodeMsg then, $q/2^{m+1}$ will be the dominating term, where m is the shortest length of $\overline{M}$. But to achieve good authenticity bounds, m is unlikely to let $q/2^{m+1}$ ruin the bound.

The presence of the tweak allows shifting of "extra" bits for randomness or state into the encoding of the header, which potentially reduces the number of bits that must be cryptographically processed.

Turning now to the authenticity bound (Theorem 8), note that if $\text{Encode}_M$ inserts b redundant bits (so $\in \approx 2^{-b}$) and $q_\epsilon + q_\mathcal{D} << 2^m$, the second term of the authenticity bound is approximately $q_\mathcal{D}/2^b$. Thus, if the tweakable cipher $\tilde{E}$ has STPRP-security up to, for example, $2^{80}$ queries (e.g., an appropriately instantiated PIV with N=256), then encoding the header with a nonce, and the message with 80 bits of redundancy, yields an AEAD scheme with roughly 80-bit privacy and authenticity guarantees, and one that can tolerate nonce-misuse.

The proof of Theorem 8 can be easily modified to show that the stated bound holds even if the adversary controls the coins and state of $\text{Encode}_M$ and $\text{Encode}_H$. Additionally, only decryption oracle queries are assumed to be not redundant—adversaries are not assumed to respect any nonces encoded into the headers or messages.

Proof of Theorem 7.

$$\Pi \xleftarrow{\$} BC(\overline{\mathcal{H}}, \overline{\mathcal{M}})$$

is a random cipher. $\Psi[\Pi]$ is the AEAD scheme obtained by replacing $\tilde{E}_K$ and $\tilde{E}_K^{-1}$ with $\Pi$ and $\Pi^{-1}$, respectively, everywhere in the algorithms of $\Psi[\text{Encode}_H, \text{EncodeMsg}, \tilde{E}]$. $\epsilon_\Pi$ is the corresponding encryption algorithm. $Pr[A^{\epsilon_K(\cdot,\cdot)} \Rightarrow 1] - Pr[A^{\epsilon_\Pi(\cdot,\cdot)} \Rightarrow 1] \le Adv_{\tilde{E}}^{\tilde{sprp}}(B)$, for the standard adversary B that simulates $\epsilon_K$ or $\epsilon_\Pi$, depending on its own oracle. This leaves $$Adv_\Psi^{priv}(A) \le Adv_{\tilde{E}}^{\tilde{sprp}}(B) + Pr[A^{\epsilon_\Pi(\cdot,\cdot)} \Rightarrow 1] - Pr\left[K \xleftarrow{\$} \mathcal{K}; A^{\$_K(\cdot,\cdot)} \Rightarrow 1\right].$$

A sequence of three games in FIG. 10 helps illustrate the proof. In FIG. 10, boxed commands are included in Game 1 but omitted from Game 2, causing the $\epsilon_\Pi$ oracle to always return random strings. Game 3 bounds the probability that this change can be detected by an adversary (as measured by the probability that a "bad" value will be set).

s is the stretch of $\text{Encode}_M$. Game 1 (in FIG. 10) implements $\epsilon_\Pi$ using lazy-sampling to define $\Pi$. In particular, on the i-th query $(H_i, M_i)$, Game 1 computes the encodings $\overline{H}_i$, $\overline{M}_i$ and then samples a potential value $S_i$ to assign to $\Pi(\overline{H}_i, \overline{M}_i)$. This value will be valid so long as $\Pi(\overline{H}_i, \overline{M}_i)$ has not already been set, and as long as $S_i$ has not been used with $\overline{H}_i$ before; otherwise, Game 1 sets $bad_1$ or $bad_2$, and then reassigns $S_i$ an appropriate value.

Since Game 2 (in FIG. 10) is identical to Game 1 until $bad_1$ or $bad_2$ is set:

$$Pr[A^{\epsilon_\Pi(\cdot,\cdot)} \Rightarrow 1] = Pr[G1(A) \Rightarrow 1] = Pr[G1$$
$$(A) \Rightarrow 1 \wedge (bad_1 \vee bad_2)] + Pr[G1$$
$$(A) \Rightarrow 1 \wedge \neg (bad_1 \vee bad_2)] \le Pr[G2(A); bad_1$$
$$\vee bad_2] + Pr[G2(A) \Rightarrow 1 \wedge \neg (bad_1 \wedge bad_2)],$$

where the final line uses an alternative formulation of the fundamental lemma of game-playing. In Game 2, the value of $S_i$ is always uniformly random in $\{0,1\}^{|M_i|+s}$, and $\epsilon_\Pi$'s outputs are independent of each $M_i$. Consequently, assigning values to each $M_i$ can be postponed until after A halts. This in turn allows postponing of checking to see if $bad_1$ or $bad_2$ should be set without altering the probability that they will be. Making both these changes yields Game 3 (in FIG. 10), so $Pr[G2(A); bad_1 \vee bad_2] = Pr[G3(A); bad_1 \vee bad_2]$. Thus:

$$Pr[G2(A) \Rightarrow 1 \wedge \neg (bad_1 \vee bad_2)] =$$
$$Pr[G3(A) \Rightarrow 1 \wedge \neg (bad_1 \vee bad_2)] \le Pr[G3(A) \Rightarrow 1] =$$
$$Pr\left[K \xleftarrow{\$} \mathcal{K}; A^{\$_K(\cdot,\cdot)} \Rightarrow 1\right],$$

where the final equality follows from the fact that in Game 3, each $S_i$ is sampled independently and uniformly at random from the set of appropriately sized strings. To recap, at this point:

$$Adv_\Psi^{priv}(A) \le Adv_{\tilde{E}}^{\tilde{sprp}}(B) + Pr[G3(A); bad_1 \vee bad_2].$$

To establish an upper bound for $Pr[G3(A); bad_1 \vee bad_2]$, suppose that A has just generated its output after running in Game 3. To bound the probability that $bad_1$ gets set, $N = |\{\overline{H}_i : i \le q\}|$ is the number of distinct tweak encodings generated during the course of the game. $R_1, R_2, \ldots, R_N \subseteq \{1, 2, \ldots, q\}$ are equivalence classes characterized by the property that i and j are in the same class if and only if $\overline{H}_i = \overline{H}_j$. The probability that $bad_1$ will be set is at most $\Sigma_k \delta_M(|R_k|)$. The upper bound is obtained by summing the values of the increasing convex function $\delta_M$ at the points $|R_1|, |R_2|, \ldots, |R_N|$ where $|R_1| + |R_2| + \ldots + |R_N| = q$. Consequently, the bound is largest (for fixed q) when N=1 and $R_1 = \{1, 2, \ldots, q\}$. But suppose that each $|R_k| < d$, an event denoted as Capped. In this case, $\Pr[G3(A); \neg \text{Capped}] \leq \delta_H(q)$. Given that Capped occurs, $\Sigma_k \delta_M(|R_k|)$ is largest when $N = \lceil q/(d-1) \rceil$ and $|R_k| = d-1$ for $k = 1, 2, \ldots, N-1$. This yields:

$$\Pr[G3(A); \text{bad}_1] \leq \Pr[G3(A); \text{bad}_1 | \text{Capped}] + \Pr[G3(A); \text{bad}_1 | \neg \text{Capped}]$$

$$\Pr[G3(A); \neg \text{Capped}] \leq \delta_M(d-1)\left\lceil \frac{q}{d-1} \right\rceil + \delta_M(q)\delta_H(q).$$

Similarly:

$$\Pr[G3(A); \text{bad}_2] \leq \Pr[G3(A); \text{bad}_2 | \text{Capped}] + \Pr[G3(A); \text{bad}_2 | \neg \text{Capped}]$$

$$\Pr[G3(A); \neg \text{Capped}] \leq \frac{(d-1)(d-2)}{2^{m+1}}\left\lceil \frac{q}{d-1}\right\rceil + \frac{q(q-1)}{2^{m+1}}\delta_H(q),$$

since the standard $i \mapsto i(i-1)/2^{m+1}$ birthday bound (for the probability of a collision among independent random variables sampled uniformly from $\{0,1\}^m$) meets the criterion of an increasing convex function.

Proof of Theorem 8. Let B be the STPRP adversary that simulates the INT-CTXT experiment for A and outputs 1 if A would set Forges to true. Then $\text{Adv}_\Psi^{ctxt}(A) \leq \text{Adv}_{\tilde{E}}^{\widetilde{\text{prp}}}(B) + \text{Adv}_{\Psi[\Pi]}^{int\text{-}ctxt}(A)$ where $\Psi[\Pi]$ is the scheme obtained by replacing $\tilde{E}_K$ and $\tilde{E}_K^{-1}$ with $\Pi$ and $\Pi^{-1}$, respectively, everywhere in the algorithms of $\Psi$, and $\text{Adv}_{\Psi[\Pi]}^{int\text{-}ctxt}(A)$ is defined in the natural way (with probabilities over the random choice of $\Pi$, rather than K).

Game 4 (FIG. 11) simulates the IND-CTXT experiment for $S \in [\Pi]$. By defining $\Pi$ through lazy sampling, $\text{Adv}_{\Psi[\Pi]}^{int\text{-}ctxt}(A) = \Pr[G4(A); \text{Forges}]$. In the code for the $\mathcal{D}_\Pi$ oracle, it need not check if $\Pi^{-1}(\overline{H}, Y)$ has already been defined; this possibility is excluded by the fact that A does not repeat queries to $\mathcal{D}_\Pi$, and does not send $\mathcal{D}_\Pi$ a value previously returned by $\epsilon_\Pi$ (while preserving the header). For some query to $\mathcal{D}_\Pi$. The probability that A forges on this query is equal to the probability that the corresponding, randomly chosen value of $\mathcal{M}$ is a valid encoding. There are at most $2^{|Y|} \in$ valid encodings of the correct length, and $\mathcal{M}$ is sampled from a set of size at least $2^{|Y|} - (q_\epsilon + q_D)$. Consequently, A forges on this query with probability at most $2^{|Y|} \in /(2^{|Y|} - (q_\epsilon + q_D)) < 2^m \in /(2^m - 2^{m-1}) = 2\epsilon$. A union bound completes the proof.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
   receiving a header and a plaintext message;
   processing the plaintext message using a variable-input-length tweakable cipher ("VILTC") to provide authenticated encryption with associated data, wherein the processing the plaintext message includes:
     determining a modified header using the header and reconstruction information;
     determining a modified message using the plaintext message and at least part of the modified header; and
     encrypting the modified message using the VILTC with the modified header as a tweak for the VILTC; and
   outputting the header and the encrypted message.

2. The method of claim 1 further comprising:
   outputting the reconstruction information.

3. The method of claim 1 wherein the reconstruction information is a nonce, and wherein the determining the modified message includes:
   adding the nonce as a prefix of the modified message.

4. The method of claim 1 wherein the processing the plaintext message further includes, as part of the determining the modified message, appending a pre-determined number of zero bits to the plaintext message.

5. The method of claim 1 wherein the reconstruction information is a value of a counter or random number.

6. The method of claim 1 wherein the header includes information used for routing during transmission, and wherein the outputting the header and the encrypted message includes transmitting the header and the encrypted message.

7. The method of claim 1 wherein, for format preserving encryption ("FPE"), the plaintext message is data stored in disk storage or main memory, and wherein the outputting the header and the encrypted message includes storing the header and the encrypted message in disk storage or main memory.

8. A computer-implemented system comprising one or more processing units, wherein the system is configured to perform operations comprising:
   receiving a header and an encrypted message;
   processing the encrypted message using a variable-input-length tweakable cipher ("VILTC") to provide authenticated decryption with associated data, wherein the processing the encrypted message includes:
     determining a modified header using the header and reconstruction information;
     decrypting the encrypted message using the VILTC with the modified header as a tweak for the VILTC, thereby producing a modified message; and
     determining a plaintext message using the modified message and at least part of the modified header; and
   outputting the plaintext message.

9. The system of claim 8 wherein the reconstruction information is a nonce, and wherein the processing the encrypted message further includes:
   verifying that the nonce matches a prefix of the modified message.

10. The system of claim 8 wherein the header includes information used for routing during transmission.

11. The system of claim 8 wherein the header and the encrypted message are received from disk storage or main memory, and wherein the outputting the plaintext message includes storing the plaintext message in disk storage or main memory.

12. The system of claim 8 wherein the operations further comprise:
   receiving the reconstruction information.

13. The system of claim 12 wherein the reconstruction information is a value of a counter or random number.

14. The system of claim 8 wherein the processing the encrypted message further includes authenticating the plaintext message.

15. The system of claim 14 wherein the authenticating the plaintext message includes checking for presence of a pre-determined number of zero bits appended to the plaintext message.

16. A computer-implemented system comprising one or more processing units, wherein the system is configured to perform operations comprising:

receiving a header and a plaintext message, wherein the plaintext message is data from disk storage or main memory;

processing the plaintext message using a variable-input-length tweakable cipher ("VILTC") to provide authenticated encryption with associated data, wherein the processing the plaintext message includes:

determining a modified header using the header and reconstruction information;

determining a modified message using the plaintext message and at least part of the modified header; and encrypting the modified message using the VILTC with the modified header as a tweak for the VILTC; and outputting the header and the encrypted message, including storing the header and the encrypted message in disk storage or main memory.

17. The system of claim 16 wherein the operations further comprise outputting the reconstruction information to disk storage or main memory.

18. A computer-implemented method comprising:
receiving a header and an encrypted message, wherein the encrypted message is data from disk storage or main memory;

processing the encrypted message using a variable-input-length tweakable cipher ("VILTC") to provide authenticated decryption with associated data, wherein the processing the encrypted message includes:

determining a modified header using the header and reconstruction information;

decrypting the encrypted message using the VILTC with the modified header as a tweak for the VILTC, thereby producing a modified message; and determining a plaintext message using the modified message and at least part of the modified header; and outputting the plaintext message, including storing the plaintext message in disk storage or main memory.

19. The method of claim 18 further comprising:
receiving the reconstruction information.

20. One or more non-transitory computer-readable media storing computer-executable instructions for causing a computer system, when programmed thereby, to perform operations comprising:

receiving first data and plaintext second data;

processing the plaintext second data using a variable-input-length tweakable cipher ("VILTC") to provide authenticated encryption with associated data, wherein the processing the plaintext second data includes:

determining modified first data using the first data and reconstruction information;

determining modified second data using the plaintext second data and at least part of the modified first data; and encrypting the modified second data using the VILTC with the modified first data as a tweak for the VILTC; and outputting the first data and the encrypted second data.

21. The one or more non-transitory computer-readable media of claim 20 wherein the first data is a header and the plaintext second data is a plaintext message.

22. The one or more non-transitory computer-readable media of claim 20 wherein the plaintext second data comprises at least part of a credit card number.

23. The one or more non-transitory computer-readable media of claim 20 wherein the reconstruction information is a nonce, and wherein the determining the modified second data includes:

adding the nonce as a prefix of the plaintext second data.

24. The one or more non-transitory computer-readable media of claim 20 wherein the processing the plaintext second data further includes, as part of the determining the modified second data, appending a pre-determined number of zero bits to the plaintext second data.

25. One or more non-transitory computer-readable media storing computer-executable instructions for causing a computer system, when programmed thereby, to perform operations comprising:

receiving first data and encrypted second data;

processing the encrypted second data using a variable-input-length tweakable cipher ("VILTC") to provide authenticated decryption with associated data, wherein the processing the encrypted second data includes:

determining modified first data using the first data and reconstruction information;

decrypting the encrypted second data using the VILTC with the modified first data as a tweak for the VILTC, thereby producing modified second data; and determining plaintext second data using the modified second data and at least part of the modified first data; and outputting the plaintext second data.

26. The one or more non-transitory computer-readable media of claim 25 wherein the first data is a header and the plaintext second data is a plaintext message.

27. The one or more non-transitory computer-readable media of claim 25 wherein the plaintext second data comprises at least part of a credit card number.

28. The one or more non-transitory computer-readable media of claim 25 wherein the reconstruction information is a nonce, and wherein the processing the encrypted second data further includes:

verifying that the nonce matches a prefix of the modified second data.

29. The one or more non-transitory computer-readable media of claim 25 wherein the processing the encrypted second data further includes authenticating the plaintext second data.

* * * * *